(12) United States Patent
Uesugi et al.

(10) Patent No.: US 7,468,654 B2
(45) Date of Patent: Dec. 23, 2008

(54) AUTOMOBILE DOOR STRUCTURE

(75) Inventors: Naohisa Uesugi, Fuchu-cho (JP); Hiroshi Uchida, Fuchu-cho (JP); Kuniaki Nagao, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 529 days.

(21) Appl. No.: 11/212,781

(22) Filed: Aug. 29, 2005

(65) Prior Publication Data

US 2006/0066446 A1 Mar. 30, 2006

(30) Foreign Application Priority Data

| | | |
|---|---|---|
| Sep. 27, 2004 | (JP) | ............................. 2004-280370 |
| Sep. 27, 2004 | (JP) | ............................. 2004-280371 |
| Sep. 27, 2004 | (JP) | ............................. 2004-280372 |
| Sep. 27, 2004 | (JP) | ............................. 2004-280373 |
| Sep. 27, 2004 | (JP) | ............................. 2004-280374 |

(51) Int. Cl.
*B60Q 1/00* (2006.01)

(52) U.S. Cl. ................. 340/438; 340/425.5; 340/539.1; 296/146.1; 296/203.01; 296/205

(58) Field of Classification Search .............. 340/425.5, 340/438, 426.1, 426.24, 426.25, 691.1, 692, 340/429, 531, 539.1; 381/386, 150, 182; 296/146.1, 146.5, 146.6, 205, 203.01, 187.01
See application file for complete search history.

(56) References Cited

U.S. PATENT DOCUMENTS 4,648,208 A    3/1987  Baldamus et al.
4,905,860 A *  3/1990  Kurihara et al. ................ 381/86
4,915,442 A    4/1990  Garnweidner
5,325,632 A *  7/1994  Djavairian et al. ............. 49/502
5,345,720 A    9/1994  Illbruck et al.
5,362,096 A * 11/1994  Satoh et al. ................ 280/728.3
6,135,541 A * 10/2000  Geise et al. .................. 296/1.03
6,226,927 B1 * 5/2001  Bertolini et al. ................ 49/502
6,878,432 B2 * 4/2005  Ueda et al. ................... 428/174
6,987,860 B2 * 1/2006  Kurihara et al. ............. 381/386

FOREIGN PATENT DOCUMENTS

| | | |
|---|---|---|
| EP | 0 302 044 | 2/1989 |
| EP | 0 551 825 | 7/1993 |
| JP | 10-138759 | * 5/1998 |
| JP | 2003-118364 | 4/2003 |

OTHER PUBLICATIONS

European Search Report, mailed May 8, 2008 and issued in corresponding European Patent Application No. 05018802.8-1523.

* cited by examiner

*Primary Examiner*—Daniel Previl

(57) ABSTRACT

Disclosed is an automobile door structure supported on an automobile body and adapted to be engaged with and disengaged from said automobile body through a door latch, which comprises an outer segment 2, and an inner segment 6, 8 disposed on the side of an automobile cabin relative to the outer segment 2 and provided with the door latch. The inner segment includes enhancement means 50 for enhancing an acoustic conversion efficiency of a vibration having a specific low frequency among vibrations of the door latch generated during door closing. The automobile door structure of the present invention can enhance a low-frequency sound capable of giving the impression of dignity on an occupant.

20 Claims, 11 Drawing Sheets

AUTOMOBILE DOOR STRUCTURE

TECHNICAL FIELD

The present invention relates to an automobile door structure, and more particularly to an automobile door structure supported on an automobile body and adapted to be engaged with and disengaged from the automobile body through a door latch.

BACKGROUND ART

Heretofore, there have been known various techniques for suppressing vibrations/noises in an automobile door. For example, the following Patent Publication 1 (Japanese Patent Laid-Open Publication No. 2003-118364) discloses a technique relating to a sound absorbing material, which is to be used for blocking the propagation of vibration from the inside of an automobile to the outside.

As a technique for preventing the occurrence of abnormal noises during closing of an automobile door or door closing, the following Patent Publication 2 (Japanese Patent Laid-Open Publication No. 10-138759) discloses an automobile door structure comprising a stopper portion provided on a door inner panel at a given position where the stopper portion is to be brought into contact with a door switch mounted on an automobile body, during door closing, so as to suppress vibrations of the inner panel during door closing.

There has also been known a technique for suppressing high-frequency sounds by use of a sound absorbing material, such as urethane, disposed inside an automobile door.

SUMMARY OF THE INVENTION

As to a door closing sound to be generated during door closing, a low-frequency sound having a relatively low frequency can create the impression of stateliness or dignity on a user or occupant, as compared to a high-frequency sound having a relatively high frequency. Therefore, in view of a higher product value as an automobile, it is desired to enhance a low-frequency sound among door closing sounds to be radiated from an automobile door.

However, the above door structures disclosed in the Patent Publications 1 and 2 cannot enhance a low-frequency sound. While the technique for absorbing a high-frequency sound by use of urethane or the like can absorb a high-frequency sound, it cannot enhance a low-frequency sound.

In view of the above problems in the conventional techniques, it is therefore an object of the present invention to provide an automobile door capable of enhancing a low-frequency sound which allows a user or occupant to receive the impression of dignity.

In order to achieve the above object, the present invention provides an automobile door structure supported on an automobile body and adapted to be engaged with and disengaged from the automobile body through a door latch, which comprises an outer segment, and an inner segment disposed on the side of an automobile cabin relative to the outer segment and provided with the door latch. The inner segment includes enhancement means for enhancing an acoustic conversion efficiency of a vibration having a specific low frequency among vibrations of the door latch generated during door closing.

According to the automobile door structure of the present invention, the inner segment having the door latch includes the enhancement means for enhancing an acoustic conversion efficiency of a vibration having a specific low frequency among vibrations of the door latch generated during door closing. Thus, vibrational energy of the specific low frequency capable of creating the impression of dignity on an occupant, among vibration of the door latch generated during door closing will be converted to enhanced acoustic radiation energy. This makes it possible to enhance a low-frequency sound to be radiated from the inner segment so as to allow the occupant to receive the impression of dignity from the door closing sound. Further, this enhanced low-frequency sound is radiated to a space between the outer segment and the inner segment, and then radiated outside the automobile through the outer segment. The door closing sound transmitted through the outer segment is reduced in high-frequency components, so that the impression of dignity can be more reliably created on a user who is outside the automobile.

These and other objects, features and advantages of the present invention will become more apparent upon reading of the following detailed description along with the accompanied drawings.

DETAILED DESCRIPTION OF INVENTION

Figure 1:
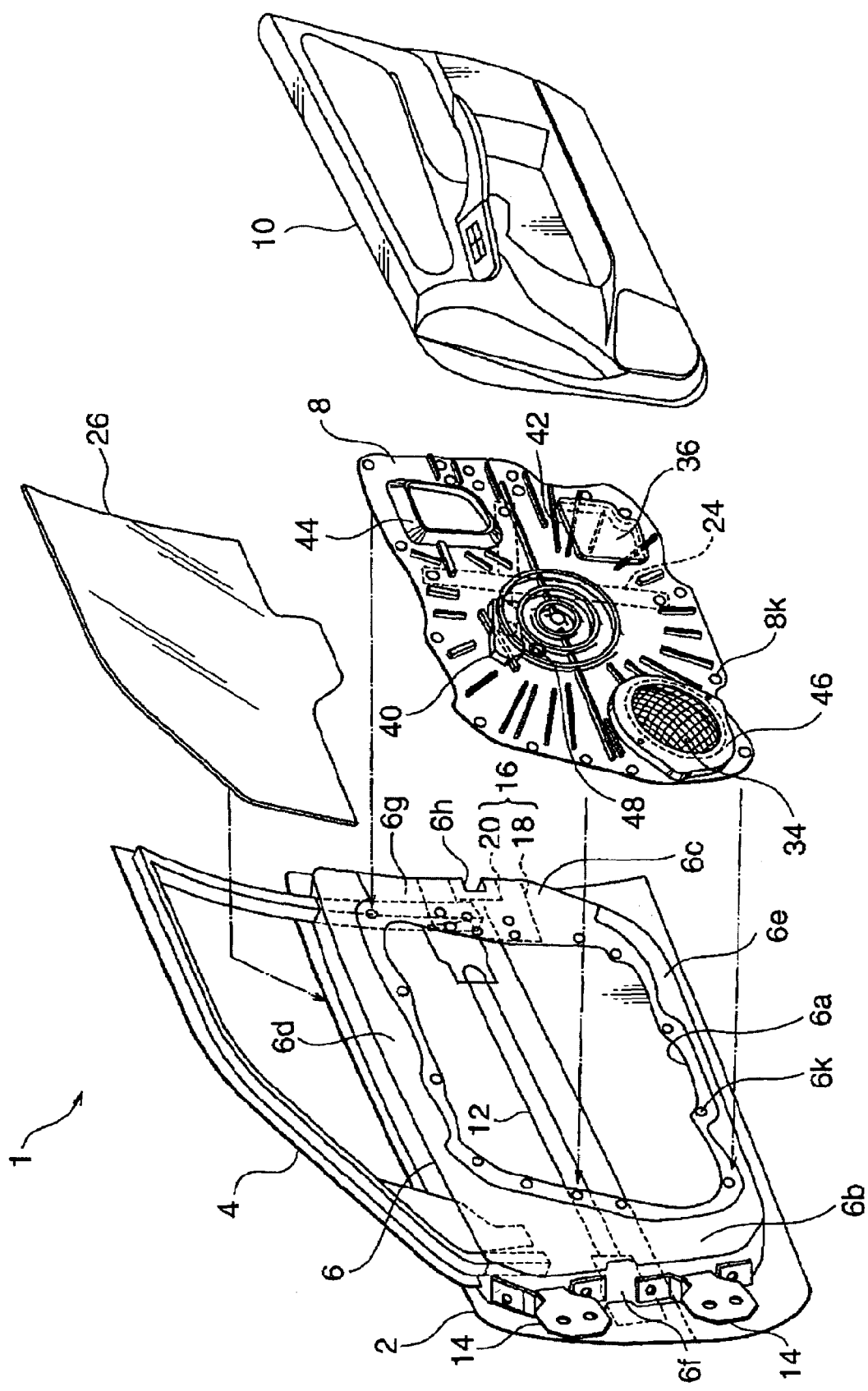
FIG. 1 is an exploded perspective view showing a fundamental structure of a front door having an automobile door structure according one embodiment of the present invention.
Figure 2:
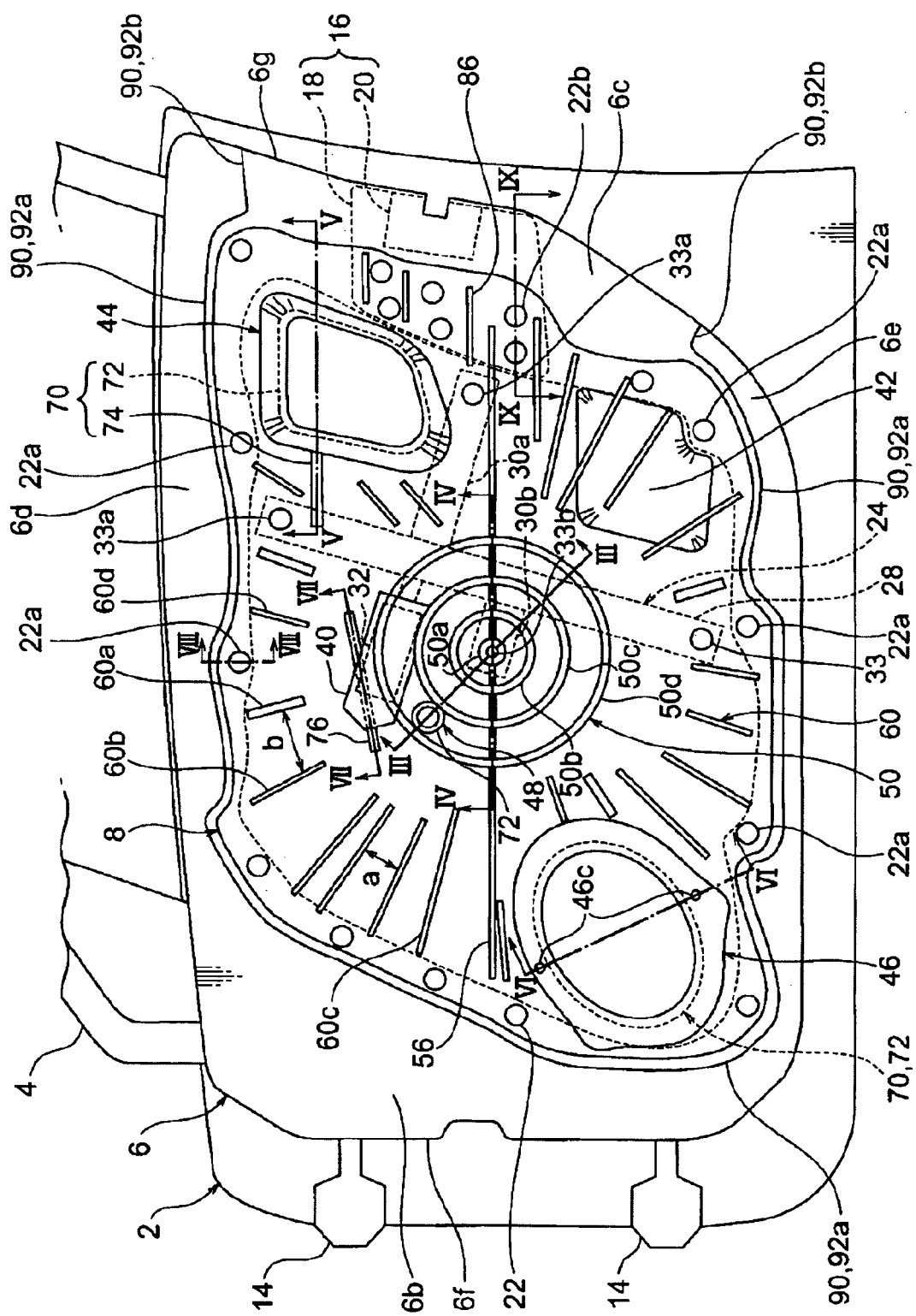
FIG. 2 is a top plan view showing respective structures of a door inner panel and a door module in the embodiment of the present invention, viewing from the side of an automobile cabin.

With reference to the accompanying drawings, an embodiment of the present invention will now be described. FIG. 1 is an exploded perspective view showing a fundamental structure of a front door having an automobile door structure according one embodiment of the present invention. FIG. 2 is a top plan view showing respective structures of a door inner panel and a door module in the embodiment, viewing from the side of an automobile cabin.

As shown in FIG. 1, a front door 1 comprises a door outer panel 2 made of steel. The door outer panel 2 constitutes an outer segment of the front door 1. A window sash 4 made of steel is fixed to the door outer panel 2 by welding. A side-impact protection bar 12 is also attached to the door outer panel 2 to protect an occupant during a side impact collision.

The front door 1 further includes a door inner panel 6 made of steel, and a door module 8. The door inner panel 6 is disposed on the side of an automobile cabin relative to the door outer panel 2, and fixed to the door outer panel 2 by welding. The door module 8 is attached to the door inner panel 6 from the side of the cabin to cover an opening 6a of the door inner panel 6. The door inner panel 6 and the door module 8 constitute an inner segment of the front door 1. A door trim 10 is attached to the inner segment on the side of the cabin by a fastener clip (not shown) etc.

The door inner panel 6 has a front region 6b, a rear region 6c, an upper region 6d and a lower region 6e, on a panel surface formed around the opening 6a to face the cabin. The door inner panel 6 also has a front end surface 6f extending approximately vertically from the side of the door outer panel 2 toward the cabin, at the front end of the door inner panel 6 in the frontward/rearward or longitudinal direction of an automobile body (not shown). A pair of door hinges 14 are fixed to the front end surface 6f. These door hinges are fixed to the automobile body in such a manner as to allow the front door to be supported by the automobile body in an openable and closable manner.

Further, the door inner panel 6 has a rear end surface 6g extending approximately vertically from the side of the door outer panel 2 toward the cabin, at the rear end of the door inner panel 6 in the longitudinal direction. A door latch unit 16 is installed in the inside of the rear end surface 6g and the rear region 6c. The door latch unit 16 includes a door latch bracket 18 fixed to the door inner panel 6, and a door latch mechanism 20 fixed to the door latch bracket 18. This door latch mechanism 20 is designed to be engaged with a striker (not shown) fixed to a pillar (not shown) of the automobile body through a latch opening 6h formed in the door inner panel 6 during door closing, so as to hold the front door 1 to the automobile body at a closed position.

As shown in FIGS. 1 and 2, the door module 8 is formed in an approximately rectangular shape having a longitudinal length greater than a vertical length, and the opening 6a of the inner panel 6 is formed in approximate the same shape as that of the outline of the door module 6. The door module 8 is formed to have a slightly larger size than that of the opening 6a, and an outer edge region of the door module 8 is connected to an inner edge region of the door inner panel 6 around the opening 6a. As shown in FIG. 1, each zone of the regions 6b to 6e of the door inner panel 6 around the opening 6a is formed with a plurality of blot through-holes 6k for mounting the door module, and the outer edge region of the door module 8 is formed with a plurality of blot through-holes 8k at positions corresponding to the holes 6k. As shown in FIG. 2, the door module 8 is attached to the door inner panel 6 through a plurality of connection portions 22 each having a bolt penetrating the corresponding pair of blot through-holes 6k, 8k, and a nut 82 (see FIG. 8).

As shown in FIG. 1, a plurality of functional door components, such as a window regulator 24, a speaker 34 and a side-impact protection pad member (shock absorbing member) 36, harnesses (not shown) for supplying an electricity to each of the functional door components, and cables (not shown) connected to the door latch mechanism 20, are mounted on the door module 8. In FIG. 2, the speaker 34 and the side-impact protection pad member 36 are omitted The door module 8 is formed with a motor-receiving concave portion 40 protruding toward the cabin, and a pad-member concave portion 42 having the side-impact protection pad member 36 received therein and fixed thereto. The window regulator 24 comprises a rail 28 for guiding a window glass 26, two brackets 30a, 30b, and a motor 32 for moving the window glass up and down. This motor 32 is received in the motor-receiving concave portion 40.

Further, as shown in FIG. 1, the door module 8 is formed with an operation hole portion 44, a speaker hole portion 46, and a harness hole portion 48 having the aforementioned harnesses or cables passing therethrough. The operation hole portion 44 is used in an operation for connecting a door handle (not shown) mounted on the door outer panel 2 to cables, and other operation or service. After completion of such an operation, a side-impact protection pad member (not shown) similar to that fixed to the concave portion 42 is fixed to the concave portion 42.

In a door structure according to the embodiment of the present invention, a low-frequency acoustic enhancement means is incorporated in the door module 8 to enhance a low-frequency sound capable of giving the impression of dignity on an occupant, during door closing.

The low-frequency acoustic enhancement means will be described below. During door closing, a vibration is initially generated in the door latch mechanism 20. This vibration is transmitted to the door inner panel 6, and then transmitted to the door module 8. This door module 8 is functionally required to have the above various functional door components (24, 34) mounted thereon, and the concave portions (40, 42) and hole portions (44, 46, 48) formed therein, and thereby the shape and structure of the door module 8 will be inevitably complicated. The low-frequency acoustic enhancement means is provided as a means to adjust a rigidity of the door module 8 having the aforementioned complicated shape and structure so as to enhance a vibrational/acoustic conversion efficiency of a vibration having a specific low-frequency capable of giving the impression of dignity on an occupant, among vibrations transmitted to the door module 8. That is, vibration energy with a specific low frequency in the door module 8 can be converted to increased acoustic radiation energy to thereby enhance a low-frequency sound to be radiated from the door module 8.

In this embodiment of the present invention, the low-frequency acoustic enhancement means is designed to create a 1×1 low-frequency vibration mode so as to enhance the acoustic conversion efficiency. Further, in this embodiment of the present invention, a low-frequency vibration of 200 Hz or less, particularly, ranging from 10 to 100 Hz, which is capable of more reliably giving the impression of dignity on an occupant, is selected as the specific-low-frequency vibration, and the low-frequency acoustic enhancement means is designed to enhance the acoustic conversion efficiency of such a low-frequency vibration. That is, the low-frequency acoustic enhancement means in this embodiment is designed to adjust the rigidity of the door module 8 so as to create the 1×1 mode vibration at a frequency of 200 Hz or less.

Due to the complicated shape and structure of the door module 8, it is likely that the entire door module 8 is not fully vibrated in the 1×1 mode. In this specification, the 1×1 mode vibration means that a single large antinode is created over approximately the entire door module 8. That is, in cases where a different antinode having an opposite phase relative to the target antinode is created in a portion of the door module 8, if the different antinode has a small adverse affect on the acoustic conversion efficiency, it may be considered that the 1×1 mode vibration is substantially created. Further, as long as a low-frequency sound capable of giving the impression of dignity on an occupant can be obtained, the low-frequency acoustic enhancement means may be designed to create any other suitable low-frequency mode, such as 2×1 mode or 2×2 mode.

Figure 11:
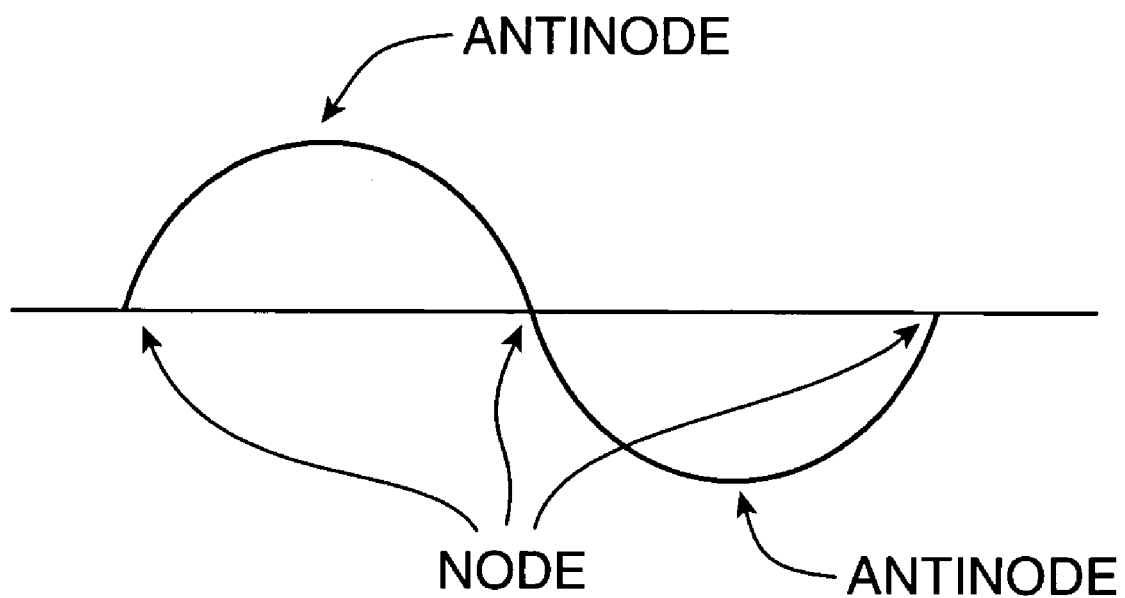
FIG. 11 is an explanatory diagram showing what "node" and "antinode" of the vibration mean.

Note that the meaning of the terms "node" and "antinode" are understood by those skilled in the art. However, for the clarification purpose, FIG. 11 is an explanatory diagram showing what "node" and "antinode" of the vibration mean. As can be seen from this figure, the node is the point where an amplitude of the vibration is ceased and the antinode is the portion, a center of which where an amplitude of the vibration maximizes. Thus, the antinode occurs in the mid-point between two nodes.

Figure 3:
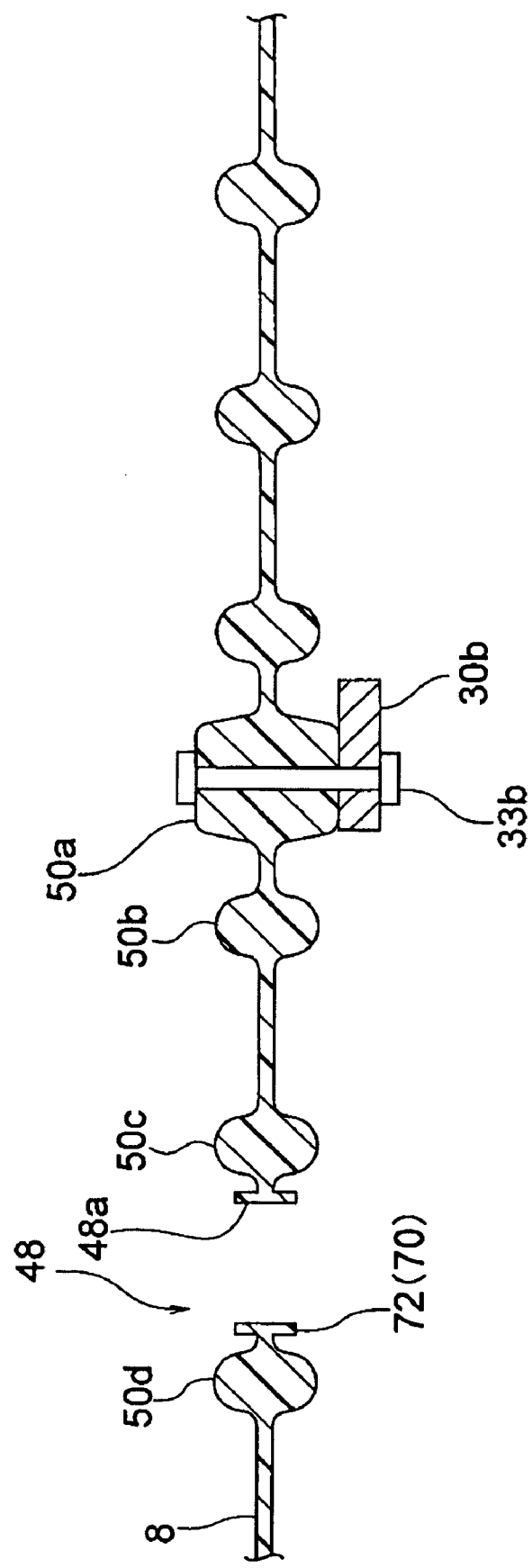
FIG. 3 is a sectional view showing a first reinforcement structure and a fourth reinforcement structure applied to a harness hole portion, taken along the line III-III in FIG. 2.
Figure 4:
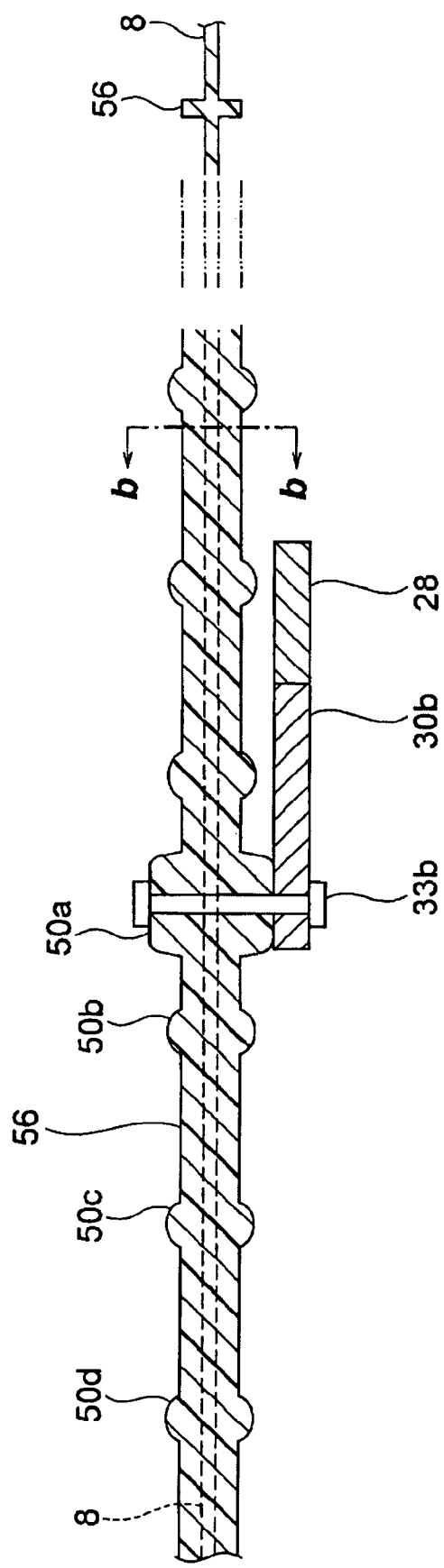
FIG. 4A is a sectional view showing the first reinforcement structure and a second reinforcement structure, taken along the line IV-IV in FIG. 2.
FIG. 4B is a sectional view showing the second reinforcement structure, taken along the line b-b in FIG. 4A.
Figure 5:
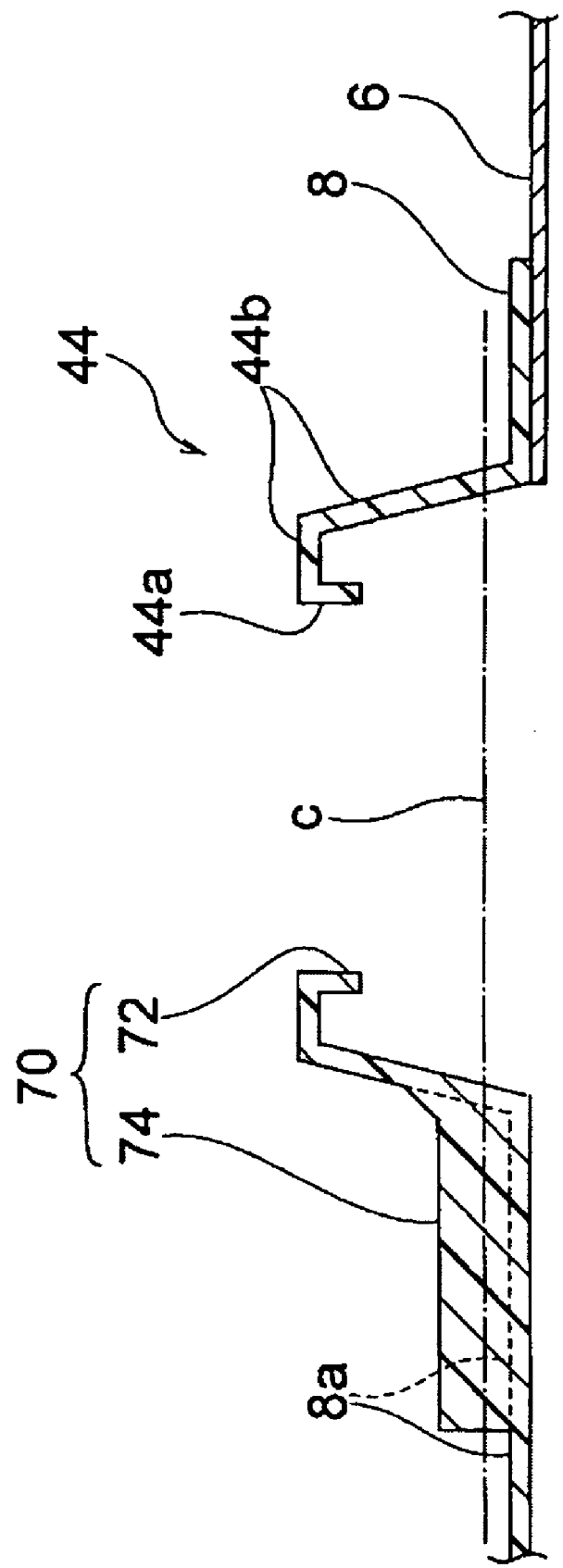
FIG. 5 is a sectional view showing the fourth reinforcement structure applied to an operation hole portion, taken along the line V-V in FIG. 2.
Figure 6:
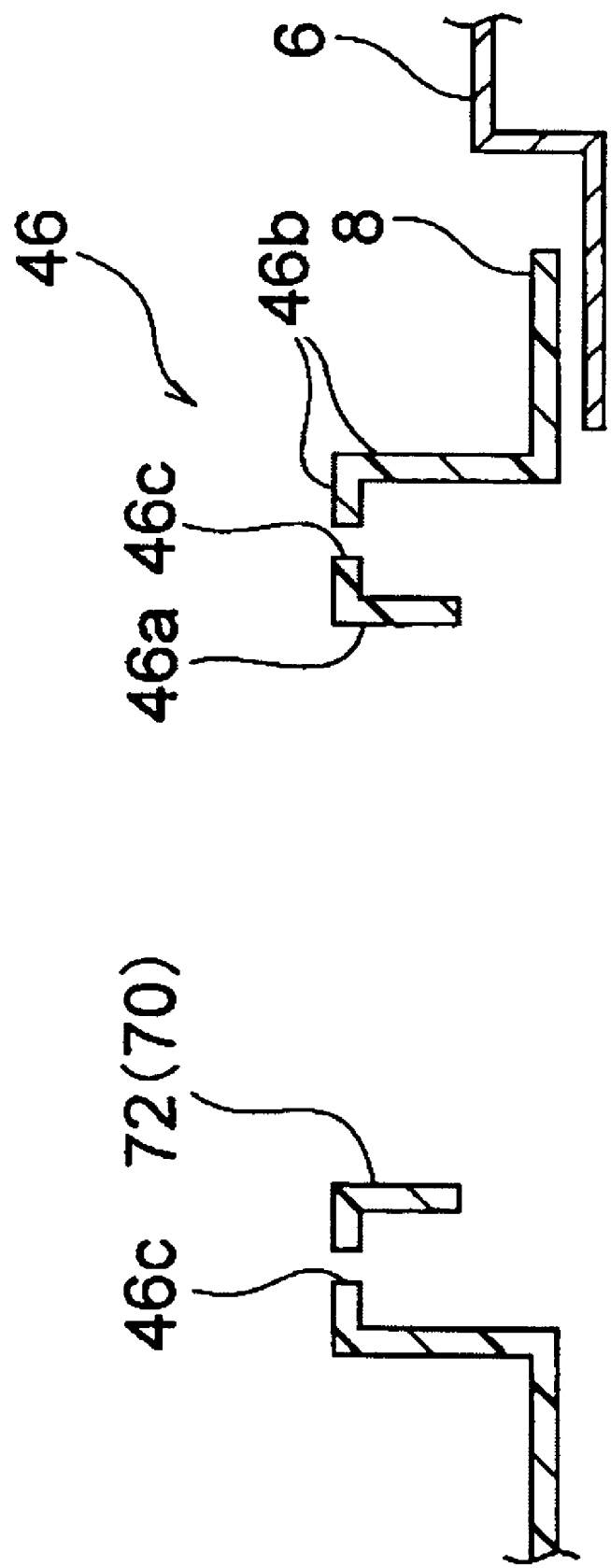
FIG. 6 is a sectional view showing the fourth reinforcement structure applied to a speaker hole portion, taken along the line VI-VI in FIG. 2.
Figure 7:
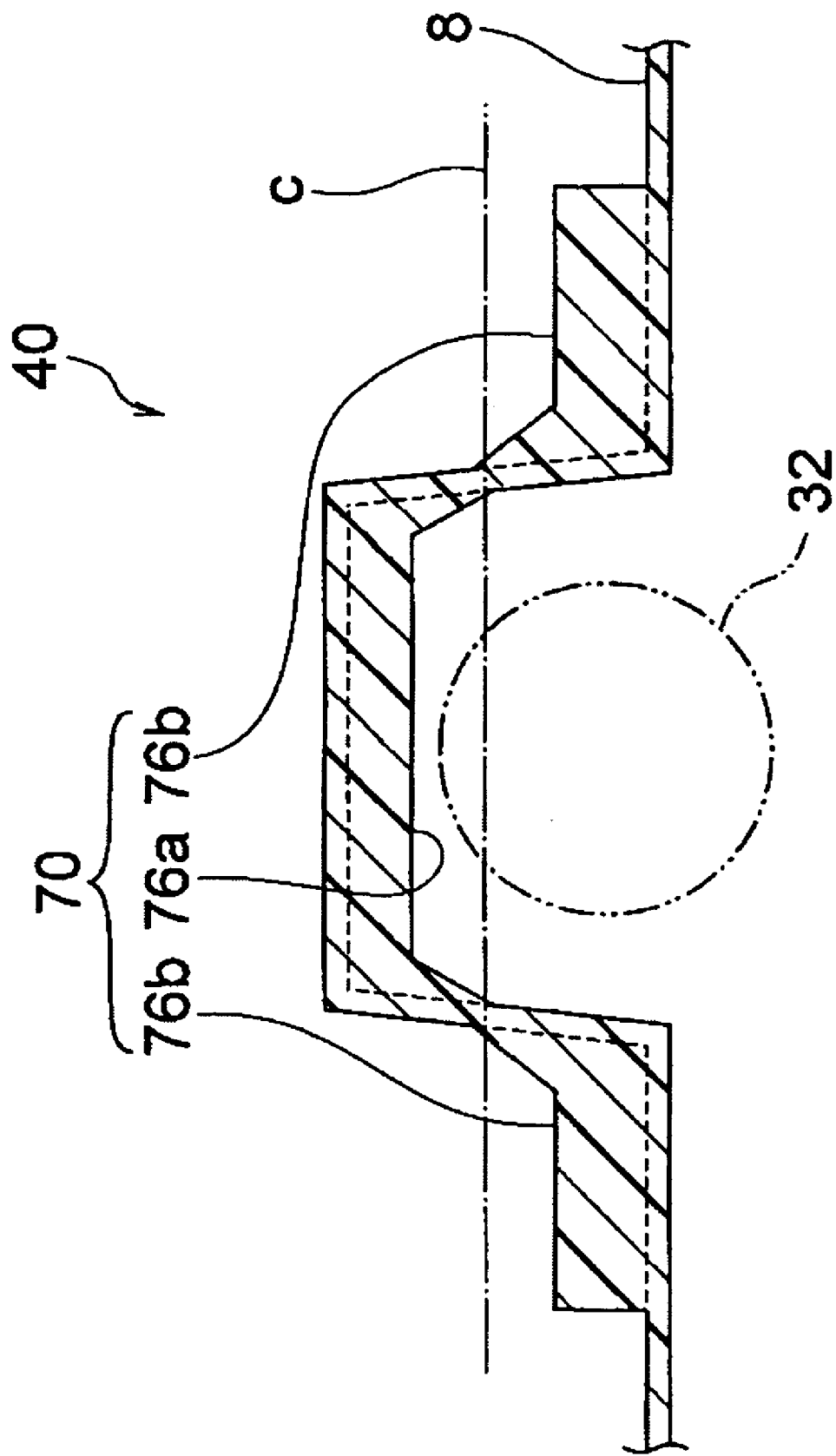
FIG. 7 is a sectional view showing the fourth reinforcement structure applied to a motor-receiving concave portion, taken along the line VII-VII in FIG. 2.

With reference to FIGS. 2 to 7, the structure of the door module 8 in this embodiment will be specifically described below. FIG. 3 is a sectional view showing a first reinforcement structure and a fourth reinforcement structure applied to the harness hole portion, taken along the line III-III in FIG. 2. FIG. 4A is a sectional view showing the first reinforcement structure and a second reinforcement structure, taken along the line IV-IV in FIG. 2, and FIG. 4B is a sectional view showing the second reinforcement structure, taken along the line b-b in FIG. 4A. FIG. 5 is a sectional view showing the fourth reinforcement structure applied to the operation hole portion, taken along the line V-V in FIG. 2. FIG. 6 is a sectional view showing the fourth reinforcement structure applied to the speaker hole portion, taken along the line VI-VI in FIG. 2. FIG. 7 is a sectional view showing the fourth reinforcement structure applied to the motor-receiving concave portion, taken along the line VII-VII in FIG. 2.

Firstly, with reference to FIGS. 2 to 4, a first reinforcement structure (first reinforcement portion) constituting the low-frequency acoustic enhancement means will be described below.

As shown in FIG. 2, the first reinforcement structure (first reinforcement portion) 50 constituting the low-frequency acoustic enhancement means is formed in a central region of the door module 8. This first reinforcement structure 50 is provided as a means to adjust a rigidity of the central region of the door module 8. The first reinforcement structure 50 comprises an annular-shaped thick-walled portion 50a located at approximately the center of the door module 8 and formed to extend circularly or annularly, and a plurality of annular-shaped thick-walled portions 50b to 50d extending annularly and approximately about the center of the door module 8 in a concentric pattern. As used in the specification, the term "center" means an approximately intermediate position of the door module 8 in the longitudinal direction of the automobile body (approximately longitudinally intermediate position of the door module 8) and an approximately intermediate position of the door module 8 in the vertical direction of the automobile body (approximately vertically intermediate position of the door module 8).

As shown in FIG. 3, each of the thick-walled portions 50a to 50d is integrally formed with the door module 8. Among these thick-walled portions 50a to 50d, the thick-walled portion 50a located at approximately the center of the door module 8 is formed to have a trapezoid shape in section, and a height greater than that of each of the thick-walled portions 50b to 50d. Each of the thick-walled portions 50b to 50d is formed to have a circular arc shape in section. The aftermentioned bracket 30b of the window regulator 24 is mounted on the thick-walled portion 50a, and the harness hole portion 48 is formed between the thick-walled portion 50c and the thick-walled portion 50d. Among these thick-walled portions 50, the thick-walled portion 50 intersecting with the motor-receiving concave portion 40 is formed along the protruded wall of the concaved portion 40 and across the concaved portion 40 (see FIG. 1).

Secondly, with reference to FIGS. 2 to 4, a second reinforcement structure (second reinforcement portion) constituting the low-frequency acoustic enhancement means will be described below.

As shown in FIG. 2, the second reinforcement structure (second reinforcement portion) 56 constituting the low-frequency acoustic enhancement means is formed in the door module 8. This second reinforcement structure 56 is provided as a means to adjust a longitudinal rigidity of the door module 8 in its entirety. The second reinforcement structure 56 comprises a linear-shaped rib 56 extending linearly and longitudinally from a first side region of the door module 8 adjacent to the door latch unit 16 to a second, opposite, side region of the door module 8 adjacent to the door hinges 14 through approximately the center of the door module 8. As shown in FIG. 4A, this linear-shaped rib 56 is integrally molded with the door module 8, and integrally molded with the plurality of thick-walled portions 50a to 50d serving as the first reinforcement structure. As shown in FIG. 4B, this linear-shaped rib 56 is formed to have a rectangular shape in section.

Thirdly, with reference to FIG. 2, a third reinforcement structure (third reinforcement portion) constituting the low-frequency acoustic enhancement means will be described below.

As shown in FIG. 2, the third reinforcement structure (third reinforcement portion) 60 constituting the low-frequency acoustic enhancement means is formed in an outer peripheral region of the door module 8. This third reinforcement structure 60 is provided as a means to adjust a rigidity of the outer peripheral region of the door module 8. The third reinforcement structure 60 comprises a plurality of radially-arranged ribs formed to extend toward approximately the center of the door module 8 in a radial pattern. The term "outer peripheral region" herein means a region of the door module 8 surrounding the aforementioned central region, and including the outer edge region attached to the door inner panel 6.

Each of the radially-arranged ribs 60 is integrally molded with the door module 8, and formed to have a rectangular shape in section in the same manner as that of the linear-shaped rib 56 (see FIG. 4B). Among these radially-arranged ribs 60, the radially-arranged rib 60 intersecting with the pad-member concave portion 42 is formed to extend curvedly along the inside or back surface of the protruded wall of the concave portion 34.

In these radially-arranged reinforcement ribs 60, the distance between the adjacent reinforcement ribs, and each width, height and length of the reinforcement ribs are adjusted to achieve the intended purpose.

Specifically, the distance between the adjacent reinforcement ribs is first set to be uneven in the circumferential direction of the outer peripheral region. More specifically, in the outer peripheral region of the door module 8, the distance between the adjacent radially-arranged ribs 60 formed in the first side region adjacent to the door latch 16 and the second side region adjacent to the door hinges 14 (e.g. "a" in FIG. 2) is set at a smaller value than the distance between the adjacent radially-arranged ribs 60 formed in the remaining region or the upper and lower regions (each extending from the first side region adjacent to the door latch 16 to the second side region adjacent to the door hinges 14) (e.g. "b" in FIG. 2).

Then, each width and/or height of the radially-arranged reinforcement ribs 60 are adjusted to allow the rigidity of the outer peripheral region formed with the radially-arranged reinforcement ribs 60 to be distributed approximately homogenously in the outer peripheral region. More specifically, when the distance between the adjacent reinforcement ribs is set at a relatively large value, one (e.g. 60*a*) of these radially-arranged reinforcement ribs 60 is formed to have a larger width or height than that of the other reinforcement rib (e.g. 60*b*). Further, each width or height of the radially-arranged reinforcement ribs 60 is adjusted to allow the mass per unit area of the outer peripheral region of the door module 8 to be distributed approximately homogenously in the outer peripheral region.

Further, as to each length of the radially-arranged reinforcement ribs 60, in the outer peripheral region of the door module 8, each of the radially-arranged reinforcement ribs 60 located in the first side region adjacent to the door latch 16 and the second side region adjacent to the door hinges 14 (e.g. 60*c*) is formed to have a larger length than that of each of the radially-arranged reinforcement ribs 60 located in the remaining region or in the upper and lower regions (e.g. 60*d*).

Fourthly, with reference to FIGS. 2, 3 and 5, a fourth reinforcement structure (fourth reinforcement portion) constituting the low-frequency acoustic enhancement means will be described below.

As shown in FIG. 2, the fourth reinforcement structure (fourth reinforcement portion) 70 constituting the low-frequency acoustic enhancement means is formed in the operation hole portion 44, the speaker hole portion 46, the harness hole portion 48 having a harness passing therethrough, and the motor-receiving concave portion 40. This fourth reinforcement structure 70 is provided as a means to adjust a rigidity of the door module 8 to provide a homogenous rigidity in a region including each of the hole portions 44, 46, 48 and the concave portion 40 and their surroundings. Specifically, when a hole portion or concave portion is formed in the door module 8, such a region has a lower rigidity or a different rigidity from that of the remaining region to cause an inhomogeneous rigidity distribution, which leads, for example, to occurrence of a node and a vibration having a bending at the node, resulting in hindrance to creation of the 1×1 mode vibration. This also causes the occurrence of high-frequency vibrations. In this embodiment, a reinforcement portion serving as the fourth reinforcement structure 70 is formed in or around each of the hole portions 44, 46, 48 and the concave portion 40 to provide a homogenous rigidity distribution in the region including each of the hole portions 44, 46, 48 and the concave portion 40 and their surroundings.

With reference to FIGS. 2 and 5, the fourth reinforcement structure 70 for the operation hole portion 44 will be described below. The operation hole portion 44 comprises an opening 44*a* and a raised wall 44*b* protruding toward the cabin. The fourth reinforcement structure 70 for the operation hole portion 44 comprises an opening reinforcement rib 72 formed around the entire circumference of the peripheral edge of the opening 44*a*, and a hole-portion reinforcement rib 74, each of which is integrally formed with the door module 8.

As shown in FIG. 5, the opening reinforcement rib 72 is formed to have a rectangular shape in section, and a height to be increased as the opening has a larger area. A similar opening reinforcement rib 72 (see FIG. 6) is formed in the speaker hole portion 46, as described later. As shown in FIG. 2, the opening 44*a* of the operation hole portion 44 has a smaller area than that of an opening 46*a* of the speaker hole portion 46. Thus, the height of the opening reinforcement rib 72 of the operation hole portion 44 is set to be less than that of the opening reinforcement rib 72 of the speaker hole portion 46.

The hole-portion reinforcement rib 74 is formed to have a rectangular shape as with the opening reinforcement rib 72, and a height which is increased as a distance from an intersecting point between a vibration neutral plane "c" indicated by the one-dot chain line in FIG. 5 and the operation hole portion 44 becomes smaller. Specifically, the vibration neutral plane "c" intersects with the raised wall 44 of the operation hole portion 44. A region of the hole-portion reinforcement rib 74 adjacent to the intersecting point between the vibration neutral plane "c" and the operation hole portion 44 has a height increasing as a distance from the intersecting point becomes smaller (i.e. as coming closer to the raised wall 44*b*), and the remaining region of the hole-portion reinforcement rib 74 has a constant height.

With reference to FIGS. 2 and 6, the fourth reinforcement structure 70 for the speaker hole portion 46 will be described below. The speaker hole portion 46 comprises an opening 46*a* and a raised wall 46*b*. The fourth reinforcement structure 70 for the speaker hole portion 46 comprises an opening reinforcement rib 72 integrally formed with the door module 8. This opening reinforcement rib 72 is formed to have a rectangular shape in section. As mentioned above, the opening reinforcement rib 72 has a height greater than that of the opening reinforcement rib 72 of the operation hole portion 44.

With reference to FIGS. 2 and 3, the fourth reinforcement structure 70 for the harness hole portion 48 having harnesses passing therethrough will be described. This fourth reinforcement structure 70 comprises an opening reinforcement rib 72 formed around the entire circumference of the peripheral edge of an opening 48*a* of the harness hole portion 48. As compared to the operation hole portion 44 and the speaker hole portion 46, the opening 48*a* of the harness hole portion 48 has a smaller area. Thus, the opening reinforcement rib 72 of the harness hole portion 48 is formed to have a height less than that of each opening reinforcement rib 72 of the operation hole portion 44 and the speaker hole portion 46.

With reference to FIGS. 2 and 7, the fourth reinforcement structure 70 for the motor-receiving concave portion 40 will be described below. The motor-receiving concave portion 40 has a rectangular shape in section and protrudes toward the cabin to receive the motor 32 therewithin or on the outside of the cabin (on the side of the outer panel 2). The fourth reinforcement structure 70 for the motor-receiving concave portion 40 comprises a concave-portion reinforcement rib 76*a* extending linearly within the concave portion 40, and a concave-portion reinforcement rib 76*b* extending linearly outward from the concave portion 40. Each of the concave-portion reinforcement ribs 76 is integrally formed with the door module 8.

As with the opening reinforcement rib 72 and the hole-portion reinforcement rib 74, the concave-portion reinforcement rib 76 is formed ton have a rectangular shape (see FIGS. 5 and 6). As with the hole-portion reinforcement rib 74 of the operation hole portion 44 etc., the height of the opening reinforcement rib 72 is set depending on the position of the vibration neutral plane.

With reference to FIG. 2 to 4, the mounting structure of the window regulator 24 constituting the low-frequency acoustic enhancement means will be described below.

As shown in FIG. 2, the window regulator 24 comprises the rail 28, the two brackets 30*a*, 30*b*, and the motor 32, which are assembles as a unit. Specifically, the motor 32 is supported by and fixed to the rail 28. Each of the brackets 30*a*, 30*b* is fixed to the rail 28 to extend in a direction approximately perpendicular to the longitudinal direction of the rail. The window regulator 24 is mounted on the door module 8 through a plurality of mounting portions 33 (including 33a and 33b) at upper and lower ends of the rail 28 and each distal end of the brackets 30 (see FIGS. 3 and 4) by use of bolts and nuts.

Among these mounting portions, each mounting structure of the upper and lower ends of the rail 28 and the distal end of the bracket 30a will be described below.

In order to avoid hindering the creation of a vibration, particularly, 1×1 node vibration, in the door module 8, the window regulator 24 is mounted at a position having a small vibration amplitude of the vibration to be created in the door module 8. Specifically, the rail 28 extends over approximately the entire vertical length of the opening door 6a of the door inner panel 6, and each of the upper and lower ends of the rail 28 is mounted in the vicinity of the outer edge region of the door module 8 (the region of the door module 8 attached to the door inner panel 6). The bracket 30a extends to the vicinity of the outer edge region of the door module 8, and the distal end of the bracket 30a is mounted on the door module 8. The bracket 30a may be provided with a connection portion 22, and mounted on the outer edge region of the door module corresponding to a vibration node, through this connection portion 22. If the 2×1 or 2×2 mode vibration is created in the door module 8, such a bracket may be mounted at a position corresponding to a node of the 2×1 or 2×2 mode vibration, or the weight of the functional door component may be imposed on the position corresponding to an antinode of the vibration, as described later.

Further, the window regulator 24 is arranged to extend around the operation hole portion 44. Specifically, a part of the rail 28 and the bracket 30a extend to surround the operation hole portion 44, and each of the upper end of the rail 28 and the distal end of the bracket 30a is mounted on the door module 8 in the vicinity of the operation hole portion 44. According to this mounting structure, the bracket 30a and a part of the rail 28 can also serve as a reinforcement member for the operation hole portion. That is, in this embodiment, the operation hole portion 44 which otherwise causes an inhomogeneous rigidity distribution in the door module 8 is reinforced by the fourth reinforcement structure 70, as described above, and additionally reinforced based on the mounting position 33a of the window regulator 24 and each shape of the rail 28 and the bracket 30a of the window regulator 24, so as to provide a homogeneous rigidity distribution.

The mounting structure of the distal end of the bracket 30b will be described below.

In this embodiment, the low-frequency acoustic enhancement means is designed to create the 1×1 mode vibration in the door module. In this case, the 1×1 mode vibration has an antinode of a vibration at approximately the center of the door module 8. Thus, when the door module 8 has a larger weight at approximately the center thereof, the 1×1 mode vibration can be more reliably created, and the amplitude of the vibration can be more reliably increased. Further, among the functional door components mounted on the door module 8, the window regulator 24 has the largest weight because it includes the weights of the motor 32, a window glass, etc.

From this point of view, in this embodiment, the bracket 30b is formed to extend up to approximately the center of the door module 8, as shown in FIG. 2, and the distal end of the bracket 30b is mounted at approximately the center of the door module 8, specifically on the annular-shaped thick-walled portion 50a (see FIGS. 3 and 4), so as to allow the weight of the window regulator 24 to be imposed on approximately the center of the door module 8. In particular, the motor 32 is mounted on the rail at a position close to the bracket 30b, and thereby the weight of the motor 32 is largely imposed on approximately the center of the door module 8. The height and diameter of the thick-walled portion 50a are also adjusted to increase its own weight. If the annular-shaped thick-walled portion 50a located at approximately the center of the plurality of annular-shaped thick-walled portions 50 is not formed, the bracket 30b may be mounted on the linear-shaped rib 56.

With reference to FIGS. 2 and 6, the mounting structure 34 of the speaker 34 to the speaker hole portion 46, constituting the low-frequency acoustic enhancement means, will be described below.

As shown in FIGS. 2 and 6, the raised wall 46a of the speaker hole portion 46 has a top surface formed with two bolt through-holes 46c. As shown in FIG. 2, these bolt through-holes 46c are formed at respective positions aligned approximately along a direction (indicated by the line VI-VI in FIG. 2) orthogonal to a direction oriented toward approximately the center of the door module 8 (a radial direction relative to the center), or along the circumferential direction relative to the center. The speaker 34 is mounted at these positions by bolts and nuts.

The speaker 34 itself has a high rigidity. Thus, when it is mounted on the door module 8 at a plurality of positions, the rigidity of the door module 8 will be increased along a line connecting between the mounting positions. Further, when the 1×1 mode vibration is created in the door module 8, the vibration amplitude is distributed in such a manner that an amplitude value is increased in a direction from the outer peripheral region to the central region of the door module.

Thus, in this embodiment, the speaker is mounted at a plurality of positions aligned approximately along a direction orthogonal to a direction oriented toward approximately the center of the door module 8, or on a line having approximately the same vibration amplitude, so as to avoid hindering the creation of a low-frequency vibration, particularly the 1×1 mode vibration, in the door module 8.

Figure 8:
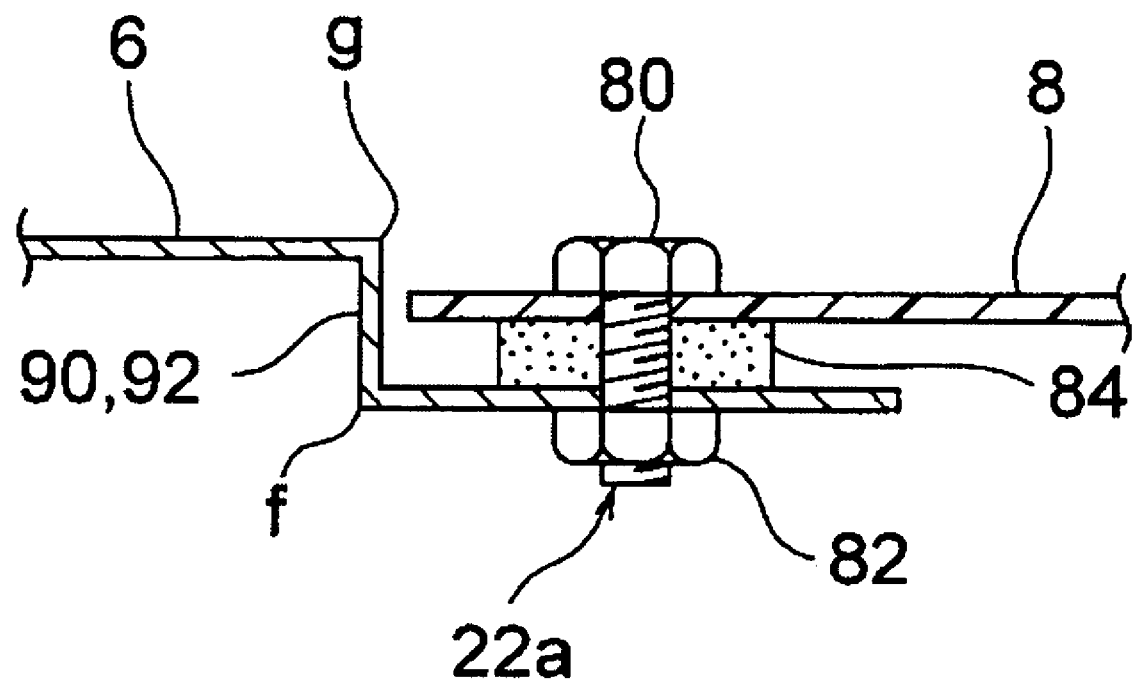
FIG. 8 is a sectional view showing a connection portion between the door module and the door inner panel, and a vibration-blocking reinforcement portion formed in the door inner panel, taken along the line VIII-VIII in FIG. 2.

With reference to FIGS. 2 and 8, the attachment structure of the door module 8 to the door inner panel 6 will be described below. FIG. 8 is a sectional view showing the connection portion between the door module and the door inner panel, and a vibration-blocking reinforcement portion formed in the door inner panel, taken along the line VIII-VIII in FIG. 2.

As shown in FIG. 2, the door module 8 is attached to the door inner panel 6 along the outer edge region thereof through the plurality of connection portions 22, as described above.

Figure 9:
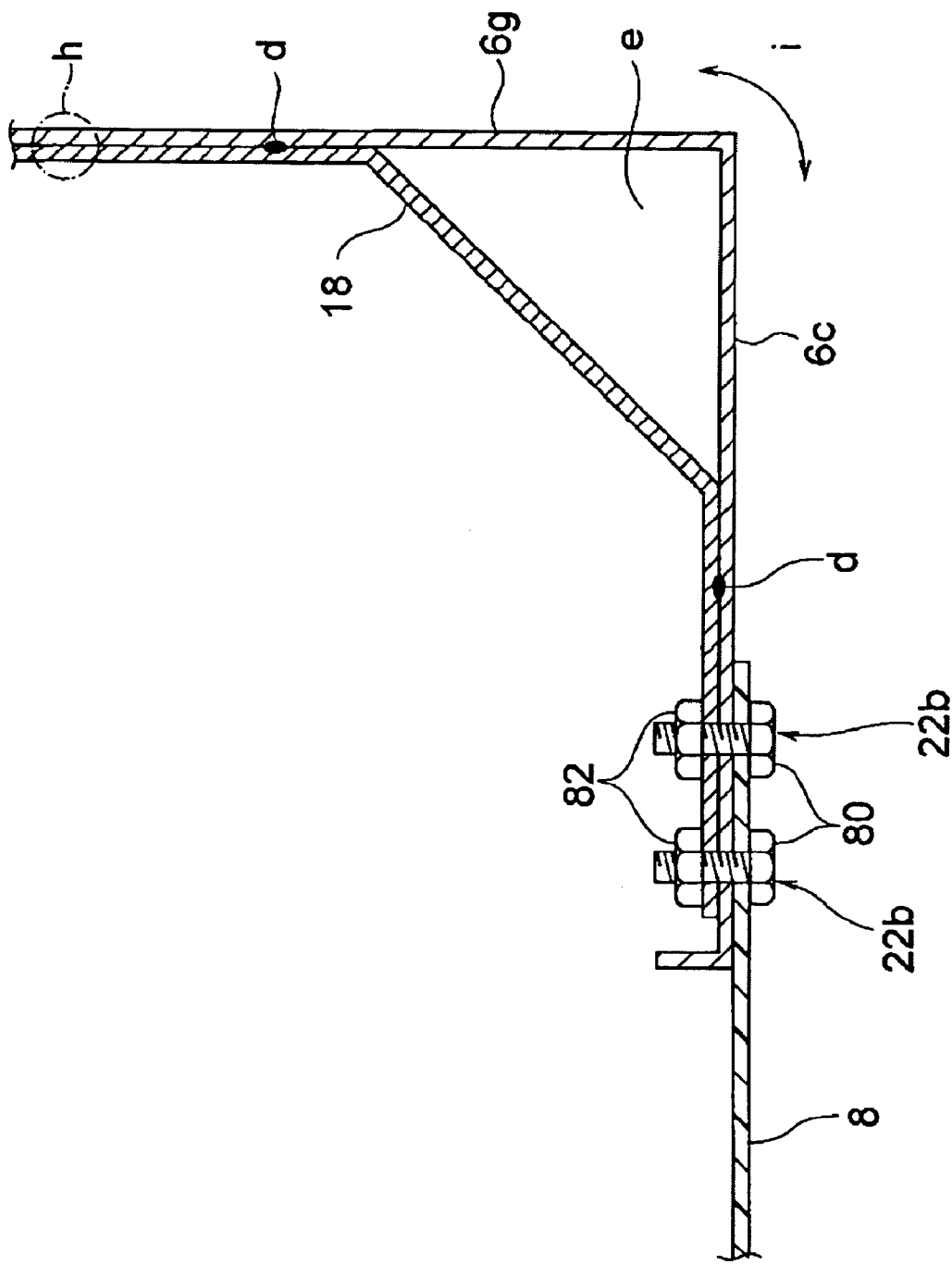
FIG. 9 is a sectional view showing the structure of a door latch unit, and a connection structure of the door module, the door inner panel and a door latch bracket.

Among these connection portions 22, each of eight connection portions 22 aligned along the first side region adjacent to the door latch (the rear edge region of the door module 8) and five connection portions 22 aligned on the second side region opposite to the first side region (the front edge region of the door module 8) is designed to provide a rigid connection using bolts 80 and nuts 82 (see FIG. 9).

In contrast, among the connection portions aligned in a direction oriented from the first side region adjacent to the door latch to the second side region (in the long edge direction) in the upper and lower edge regions of the door module 8, each of five connection portion 22a located in an approximately longitudinally intermediate region is designed to provide a weaker connection than that in the connection portions 22 aligned along the vertically-extending first and second side regions (in the short edge direction). Specifically, as shown in FIG. 8, each of the connection portions 22a includes an elastic member 84 (e.g. a rubber member) disposed between the door module 8 and the door inner panel 6, and the door module 8 is connected to the door inner panel 6 by bolts 80 and nuts 82 through the elastic member 84.

In this manner, each of these connection portions 22*a* has a weaker connection than that of the remaining connection portions 22 to allow a displacement of the door module 8 relative to the door inner panel 6 so as to avoid hindering the creation of a low-frequency vibration, particularly the 1×1 mode vibration, in the door module 8. The elastic member 84 may be incorporated in all of the connection portions 22 aligned in a direction oriented from the first side region adjacent to the door latch to the second, opposite, side.

With reference to FIGS. 2 and 9, the structure of the door latch unit 16, and the connection structure of the door module 8, the door inner panel 6 and the door latch unit 16, will be described below. FIG. 9 is a sectional view showing the structure of the door latch unit, and a connection structure of the door module, the door inner panel and the door latch bracket.

The door structure according to this embodiment is designed to enhance the specific-low-frequency vibration among vibrations generated in the door latch mechanism 20 during door closing and transmitted to the door module 8, by use of the low-frequency acoustic enhancement means. Thus, in this embodiment, the structure of the door latch unit 16 and the connection structure of the door module 8, the door inner panel 6 and the door latch bracket 18 are designed to allow the vibrations generated in the door latch mechanism 20 during door closing to be more efficiently transmitted to the door module 8.

As shown in FIG. 9, the door latch bracket 18 is fixed to the rear end surface 6*g* and the rear region 6*c* of the door inner panel 6 at a plurality of positions as indicated by "d" in FIG. 9 by welding. The door latch mechanism 20 is fixed to the door latch bracket 18 at a position as shown in FIG. 2. The door latch bracket 18 has a bended shape allowing a triangular-shaped closed section (indicated by "e" in FIG. 9) to be defined in cooperation with the door inner panel 6 in a space above and below the door latch mechanism 20 or where the door latch mechanism 20 is not located.

As shown in FIGS. 2 and 9, the door latch bracket 18 extends longitudinally frontward up to a position overlapping the door module 8. In the six connection portions 22*b* corresponding to the door latch unit 16, all of the door module 8, the door inner panel 6 and the door latch bracket 18 are connected together using common bolts 80 and nuts 82 to provide increased connection rigidity (attaching rigidity of the door module 8 to the door inner panel 6) as compared to the remaining connection portions 22 other than the connection portions 22*b*. As shown in FIG. 2, these connection portions 22*b* are arranged in two lines extending along a direction intersecting with a direction oriented from the door latch unit 16 toward the door module 8 (along the first side region of the door module 8 adjacent to the door latch unit), or along a direction intersecting a direction in which the vibration is transmitted (in the longitudinal direction of the automobile body in this embodiment).

Further, in a region where the connection portions 22*b* are located or a region where all of the door module 8, the door inner panel 6 and the door latch bracket 18 overlap, the door module 8 is integrally formed with a reinforcement rib (reinforcement portion) 86 extending in a direction oriented from the door latch unit 16 toward the door module 8.

With reference to FIGS. 2 and 8, a vibration-blocking reinforcement structure formed in the door inner panel 6 to more reliably radiate vibrations of a low-frequency sound from the door module 8 will be described below.

In this embodiment, a vibration-blocking reinforcement structure is formed in the door inner panel 6 to allow vibrations generated in the door latch mechanism 20 to be efficiently transmitted to the door module 8, and allow vibrations generated in the door latch mechanism 20 and vibrations transmitted to the door module 8 to become less likely to be transmitted to the door inner panel 6.

Specifically, as shown in FIG. 2, the door inner panel 6 is formed with a vibration-blocking reinforcement portion 90 extending continuously and linearly. As show in FIG. 8, the vibration-blocking reinforcement portion 90 comprises a step-shaped portion 92 formed by bending the door inner panel 6 at two positions "f" and "g" in FIG. 8 to provide enhanced rigidity.

This step-shaped portion 92 has a first vibration-blocking portion 92*a* extending continuously to surround the door module 8 in the front region 6*b*, the upper region 6*d* and the lower region 6*e* of the door inner panel 6 except for the rear region 6*c* or a surface region of the door inner panel 6 on the side of the door latch unit 16, and a second vibration-blocking portion 92*b* formed in the rear region 6*c* of the door inner panel 6, as shown in FIG. 2. The second vibration-blocking portion 92*b* extends continuously from the first vibration-blocking portion 92*a* on the upper and lower sides of the door latch unit 16 to allow the upper region 6*d* and lower region 6*e* to be isolated from the door latch unit 16, and extends up to the boundary between the rear region 6*c* and the rear end surface 6*g* of the door inner panel 6. The rear end surface 6*g* of the door inner panel 6 may be formed with a step-shaped portion extending continuously from the second vibration-blocking portion 92*b*.

Figure 10:
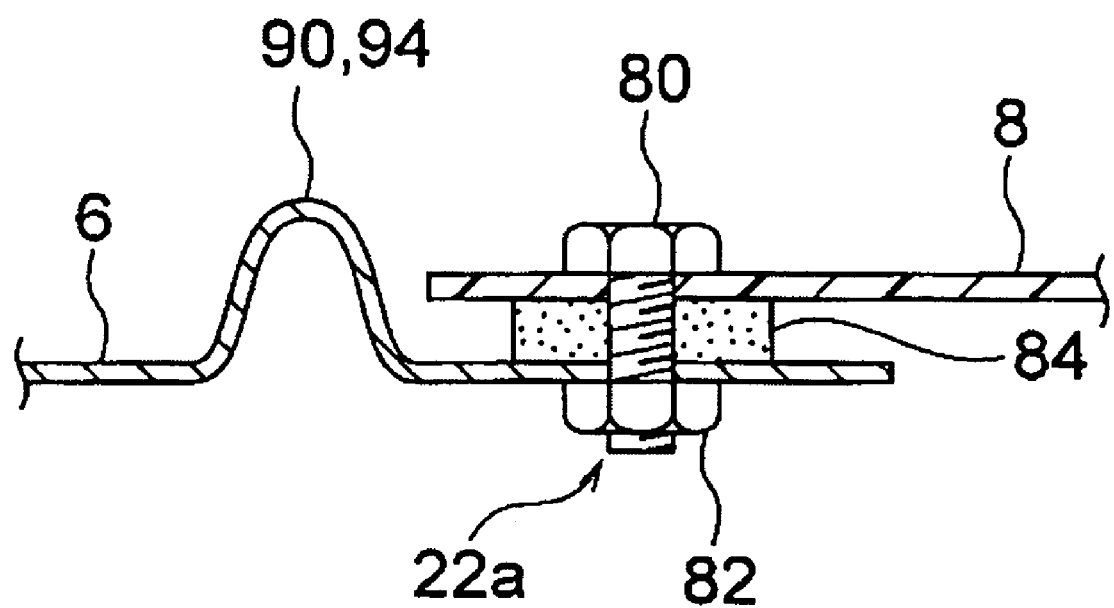
FIG. 10 is a sectional view corresponding to FIG. 8, which shows one modification of the vibration-blocking reinforcement portion formed in the door inner panel illustrated in FIG. 8.

As shown in FIG. 8, this step-shaped portion 92 is formed to have a height protruding outside from the surface of the door module 8. The step-shaped portion 92 formed in this manner makes it possible to more effectively block vibrations and prevent a sound radiated from the door module 8 from escaping in four directions so as to provide more increased acoustic radiation energy. This vibration-blocking reinforcement portion 90 may be comprised of a bead-shaped portion 94, as shown in FIG. 10. As with the step-shaped portion 92, this bead-shaped portion 94 makes it possible to provide increased rigidity so as to block vibrations. Further, this bead-shaped portion 94 preferably has a height protruding outside from the surface of the door module 8.

Major functions/effects of the door structure according to this embodiment will be described below.

In the door structure according to this embodiment, the low-frequency acoustic enhancement means can convert vibration energy of the specific low-frequency capable of giving the impression of dignity on an occupant, among vibrations of the door latch mechanism 20 generated during door closing and transmitted to the door module 8, to increased acoustic radiation energy, so as to enhance a low-frequency sound to be radiated from door module 8.

Among the enhanced low-frequency sound, a low-frequency sound radiated toward the cabin allows an occupant in the cabin to receive the impression of dignity from the door closing sound. Further, the low-frequency sound radiated into the cabin is reduced in high-frequency components by the door trim 10. This makes it possible to more reliably give the impression of dignity on the occupant in the cabin.

Among the enhanced low-frequency sound, a low-frequency sound oriented in the outward direction of the cabin is radiated in a space between the door outer panel (outer segment) and the door inner panel 6/the door module 8 (inner segment), and radiated outside the automobile through the door outer panel 2. Thus, a user who is in the outside of the automobile can receive the impression of dignity from the door closing sound. Further, the door closing sound transmitted through the door outer panel 2 is reduced in high-frequency components. This makes it possible to more reliably give the impression of dignity on the user in the outside of the automobile.

The functions/effects of the door structure according to this embodiment will be specifically described.

In this embodiment, the first to fourth reinforcement structures (reinforcement portions) can adjust the rigidity of the door module 8 in such a manner as to allow a vibration of the 1×1 vibration mode to be generated in the door module 8 so as to enhance a low-frequency sound to be radiated from the door module 8.

Firstly, the first reinforcement structure is the annular-shaped thick-walled portion 50 which is an annular-shaped reinforcement portion extending annularly and about approximately the center of the door module 8. The annular-shaped thick-walled portion 50 can annularly reinforce the central region of the door module 8. This makes it possible to reliably create the 1×1 mode vibration. Specifically, the annular-shaped thick-walled portion 50 allows an antinode of a vibration to be created at approximately the center of the door module 8. In addition, the annular-shaped thick-walled portion 50 provided in a plural number and formed in a concentric pattern makes it possible to more reliably create the 1×1 mode vibration, while suppressing the occurrence of high-frequency vibrations.

Secondly, the second reinforcement structure is a linear-shaped rib 56 extending from the first side region of the door module 8 adjacent to the door latch unit 16 to the second, opposite, region adjacent to the door hinges 14 through approximately the center of the door module 8. This linear-shaped rib 56 makes it possible to adjust the longitudinal rigidity of the entire door module 8 in such a manner as to be homogenized. This can prevent a vibration node from being created in approximately the entire region of the door module 8 except for the outer edge region thereof so as to facilitate the creation of the 1×1 mode vibration. In addition, this linear-shaped rib 56 allows the door module 8 to create a vibration antinode having an approximately entirely smooth vibration distribution (vibration amplitude distribution). This smooth vibration distribution can more reliably enhance the acoustic radiation efficiency of a low-frequency sound.

In particular, the linear-shaped rib 56 extends along a direction in which a vibration generated in the door latch mechanism 20 is transmitted, or along a direction from the first side region adjacent to the door latch unit 16 to the second, opposite, side region adjacent to the door hinges 14 through approximately the center of the door module 8. This makes it possible to effectively create the 1×1 mode vibration.

Furthermore, the linear-shaped rib 56 integrally formed with the annular-shaped thick-walled portions 50 (first reinforcement structure) makes it possible to allow the region of the door module formed with the plurality of annular-shaped thick-walled portions 50 to be integrally vibrated as a vibration antinode, and to prevent a vibration node from being created due to bending at the boundary between the outermost annular-shaped thick-walled portion 50 and its surrounding. Thus, the 1×1 mode vibration can be more reliably created while suppressing the occurrence of high-frequency vibrations.

Thirdly, the third reinforcement structure is the plurality of radially-arranged ribs 60 extending radially in a direction oriented toward approximately the center of the door module 8. These radially-arranged ribs 60 make it possible to adjust the vibration antinode distribution in such a manner that the vibration amplitude is gradually increased in a direction from the outer peripheral region of the door module 8 to approximately the center of the door module 8. Generally, the outer edge region of the door module 8 connected to the door inner panel 6 is likely to have a vibration node, and the outer peripheral region serves as the bottom of the vibration antinode distribution. Thus, the radially-arranged ribs 60 formed in the outer peripheral region to extend toward approximately the center of the door module 8 can prevent a vibration node from being created due to bending of the outer peripheral region so as to allow the 1×1 mode vibration to be created over approximately the entire door module in a smooth vibration distribution. This makes it possible to more reliably enhance the acoustic radiation efficiency of a low-frequency sound, while suppressing the occurrence of high-frequency vibrations.

Further, the plurality of radially-arranged ribs 60 are formed in such a manner that a distance between the adjacent radially-arranged ribs 60 is unevenly arranged, so as to prevent the occurrence of a specific high-frequency vibration, particularly a mid-order mode vibration of several hundred Hz (e.g. 300 Hz), which would otherwise be caused by their arrangement at even intervals.

Furthermore, each width and/or height of the plurality of radially-arranged ribs 60 is adjusted to provide a homogenous rigidity distribution in the outer peripheral region of the door module 8. The width and/or height of the plurality is also adjusted to allow the mass per unit area of the outer peripheral region of the door module 8 to be distributed approximately homogenously in the outer peripheral region. This makes it possible to smoothen the 1×1 mode vibration distribution created in the door module 8. Thus, the acoustic radiation efficiency of a low-frequency sound is enhanced. The plurality of radially-arranged ribs 60 may be additionally formed at uneven intervals to reliably create the 1×1 mode vibration.

In this embodiment, the radially-arranged rib 60 formed in the first side region adjacent to the door latch unit 16 and the second, opposite, side region adjacent to the door hinges 14, in the outer peripheral region is formed to have a length greater than that of the radially-arranged rib 60 formed in the remaining region in the outer peripheral region. In particular, this makes it possible to prevent the occurrence of a twisting vibration in the first side region adjacent to the door latch unit 16 and the second, opposite, side region adjacent to the door hinges 14. Thus, vibrations generated in the door latch mechanism 20 are efficiently transmitted in the direction from the first side region adjacent to the door latch unit 16 to the second, opposite, side region adjacent to the door hinges 14, so as to effectively create the 1×1 mode vibration. The door module 8 has a longer length in the longitudinal direction of the automobile body. Thus, the longitudinally-extending radially-arranged rib 60 formed to have a longer length in the above manner makes it possible to more reliably create the 1×1 mode vibration over approximately the entire door module 8.

Particularly, as mentioned above, the connection portions of the door module 8 to the door inner panel 6 are designed to provide a relatively strong connection in the first side region adjacent to the door latch unit 16 and the second, opposite, side region adjacent to the door hinges 14, and the radially-arranged ribs 60 formed in the vicinity of these connection portions 22 is correspondingly designed to have a relatively long length so as to provide increased rigidity, so as to allow the door module 8 to have a balanced rigidity in its entirety. This makes it possible to create the 1×1 mode vibration in a smooth vibration distribution in the direction from the first side region adjacent to the door latch unit 16 to the second, opposite, side region.

Further, the connection portions 22*a* aligned longitudinally in the upper and lower edge regions are designed to provide a relatively weak connection allowing a displacement, and the radially-arranged ribs 60 formed in the vicinity of these connection portions 22a are designed to have a relatively short length. This makes it possible to prevent the vicinity of the connection portions 22a from having excessively increased rigidity so as to avoid hindering the creation of the 1×1 mode vibration in the door module 8.

Fourthly, the fourth reinforcement structure 70 is the opening reinforcement rib 72, the hole-portion reinforcement rib 74 and the concave-portion reinforcement rib 76, for reinforcing the hole portions 44, 46, 48 and the concave portion 40 formed in the door module 8. These ribs make it possible to obtain a homogenous rigidity in the range of the hole or concave portion to its surrounding. This can prevent the creation of a vibration node in the hole portions 44, 46, 48 and the concave portion 40, and prevent the occurrence of a vibration having a bending at the boundary between the hole or concave portion and its surrounding. In other words, each of the hole portions 44, 46, 48 or the concave portion 40 can be reliably vibrated together with its surrounding (in phase), so as to facilitate the creation of the 1×1 mode vibration in the door module and provide a smooth amplitude distribution of the vibration antinode. These make it possible to enhance the acoustic radiation efficiency of the specific-low-frequency vibration, while suppressing the occurrence of high-frequency vibrations.

Each of the hole-portion reinforcement rib 74 and the concave-portion reinforcement rib 74 is formed to have a height increasing as a distance from the intersecting point between the hole or concave portion (44, 40) and the vibration neutral portion "c" becomes smaller, and the opening reinforcement rib 72 is formed to have a height to be increased as the opening has a larger area. This makes it possible to reduce a difference in rigidity between each of the hole portions 44, 46, 48 or the concave portion 40 and its surrounding so as to provide a homogenous rigidity distribution.

In the door structure according to this embodiment, the mounting structure of the speaker to the speaker hole portion 46 constituting the low-frequency acoustic enhancement means allows approximately the entire door module 8 to be reliably vibrated in the 1×1 vibration mode.

Specifically, in the speaker hole portion 46, the plurality of mounting portions 46c for the speaker 34 is provided at respective positions approximately aligned in a direction orthogonal to a direction oriented toward approximately the center of the door module 8. When 1×1 mode vibration is created in the door module 8, the vibration amplitude is distributed in such a manner as to be gradually increased in a direction from the outer peripheral region to approximately the central region of the door module 8. For example, if there is a region with an increased rigidity in the radial direction (a direction from the outer peripheral region toward the central region) over a certain distance, such a region will hinder the creation of the 1×1 mode vibration.

In this embodiment, the speaker is mounted at a plurality of positions approximately aligned in a direction (circumferential direction) orthogonal to a direction oriented toward approximately the center of the door module 8. Thus, the rigidity of the door module 8 can be increased in the circumferential direction but not in the radial direction. This makes it possible to facilitate the creation of the 1×1 mode vibration in the door module, and allow the vibration antinode to be created in a smooth vibration distribution (vibration amplitude distribution). Further, the mounting structure may be designed to reduce a difference in rigidity between the speaker hole portion 46 and its surrounding so as to provide a homogenous rigidity distribution. This make it possible to enhance the acoustic radiation efficiency as described above.

In the door structure of this embodiment, the mounting structure of the window regulator 24 to the door module 8, constituting the low-frequency acoustic enhancement means allows approximately the entire door module 8 to be reliably vibrated in the 1×1 vibration mode.

Specifically, a part of the rail 28 and the bracket 30a extend to surround around the operation hole portion 44, and each of the upper end of the rail 28 and the distal end of the bracket 30a is mounted on the door module 8 in the vicinity of the operation hole portion 44. Thus, the mounting position of the window regulator 24 and each shape of the rail 28 and the bracket 30a of the window regulator 24 allows a region of the door module 8 which otherwise has an in homogenous rigidity distribution, or the operation hole portion and its surrounding, to have a homogeneous rigidity distribution. This make it possible to enhance the acoustic radiation efficiency as described above.

Further, the bracket 30b of the window regulator 24 is formed to extend up to approximately the center of the door module 8, and the distal end of the bracket 30b is mounted at approximately the center of the door module 8. Thus, the weight of the window regulator 24 can be largely imposed on approximately the center of the door module 8 to thereby more reliably create the 1×1 mode vibration having a vibration antinode at the center of the door module 8. In addition, the vibration amplitude can be increased by the weight of the window regulator 24.

The bracket 30b is mounted on the annular-shaped thick-walled portion 50a. This annular-shaped thick-walled portion 50a is originally formed to have an increased rigidity. Thus, the creation of the 1×1 mode vibration is not hindered even if the window regulator 24 is mounted on the annular-shaped thick-walled portion 50a through the bracket 30b. The bracket 30b may be mounted on the linear-shaped rib 56 to obtain the same functions/effects. Further, when another functional door component is mounted on the door module, it may be mounted on the thick-walled portion 50, a rib or a bead to obtain the same functions/effects.

Further, the window regulator 24 is mounted at approximately the center of the door module 8 through the bracket 30b, and mounted in the vicinity of the attached region of the door module 8 to the door inner panel 6 through the bracket 30a. This makes it possible to avoid hindering the creation of the 1×1 mode vibration in the door module 8, because the vicinity of the attached region of the door module 8 to the door inner panel 6 has a relatively small vibration amplitude of the vibration created in the door module 8. Thus, a vibration antinode can have a large vibration amplitude at approximately the center of the door module while avoiding hindering the vibration, to create the 1×1 mode vibration over approximately the entire door module 8 in a smooth vibration distribution (vibration amplitude distribution) so as to enhance the acoustic radiation efficiency as described above.

Furthermore, the door module 8 is made of resin excellent in formability. Thus, the resin door module 8 can be readily formed with the first to fourth reinforcement structures 50, 56, 60, 70, the mounting structure of the speaker to the speaker hole portion 46, and the mounting structure of the window regulator 24 to the door module 8, each of which constitutes the low-frequency acoustic enhancement means. This makes it possible to form the low-frequency acoustic enhancement means at a low cost without excessive increase in weight or with reduction in weight, without deterioration in productivity and assembling performance. Further, a low-frequency sound capable of giving the impression of dignity on an occupant can be increased in a simplified structure to be obtained only by adjusting rigidity.

Functions/effects of the attachment structure of the door module 8 to the door inner panel 6 will be described below.

In this embodiment, each of the connection portions 22*a* aligned in a direction from the first side region adjacent to the door latch unit 16 to the second, opposite, side region provides a weaker connection than that in the remaining connection portions. This makes it possible to avoid hindering the creation of the 1×1 mode vibration in the door module 8 to be enhanced by the low-frequency acoustic enhancement means.

In particular, these connection portions 22*a* are disposed in the vicinity of approximately the intermediate position of the door module in a direction from the first side region adjacent to the door latch unit 16 to the second, opposite, side region. This intermediate region is located at a position where the antinode of the 1×1 mode vibration distributed in the direction the first side region adjacent to the door latch unit 16 to the second, opposite, side region adjacent to the door hinges 14 has a large vibration amplitude. Thus, the connection portions 22*a* make it possible to avoid hindering the creation of the 1×1 mode vibration.

Further, the connection portion 22*a* designed to connect the door module 8 to the door inner panel 6 by the bolt 80 and the nut 82 through the elastic member 84 allows the door module 8 to be effectively displaced relative to the door inner panel 6.

Functions/effects of the structure of the door latch unit 16, and the connection structure of the door module 8, the door inner panel 6 and the door latch unit 16, will be described below.

In this embodiment, all of the door module 8, the door inner panel 6 and the door latch bracket 18 are connected together using the common fastener. Thus, vibrations generated in the door latch mechanism 20 can be efficiently transmitted to the door module 8. A low-frequency vibration to be enhanced by the low-frequency acoustic enhancement means will become larger as the vibration transmitted to the door module 8 has a higher level. Therefore, this connection structure can effectively enhance the low-frequency sound capable of giving the impression of dignity on an occupant.

In particular, the connection portion 22*b* connected using the common fastener is designed to have a higher attaching rigidity than that in the remaining connection portions 22 so as to more efficiently transmit the vibration. Further, a plurality of bolts are used as the common fastener, and aligned in two lines each extending along a direction intersecting with a direction in which the vibration is transmitted, so as to more efficiently transmit the vibration.

Further, the triangular-shaped section is defined between the door latch braches 18 and the door inner panel 6. Thus, vibrations generated in the door latch mechanism 20 can be efficiently transmitted to the door module 8. As shown in FIG. 9, during door closing, the latch (not shown) of the door latch mechanism is brought into contact with the striker (not shown), and the door inner panel 6 receives a bending force causing a bending in a direction indicated by "i" in FIG. 9 on the basis of a fulcrum indicated by the position "h" in FIG. 9 (about an axis extending along the vertical direction of the automobile body). In other words, if the triangular-shaped section is not defined, the door inner panel 6 will have a bending deformation such that the rear end surface 6*g* and the rear region 6*c* repeatedly get closer to and away from one another, due to the bending force, to cause vibrations.

In the door structure according to this embodiment which has the triangular-shaped section defined between the door latch braches 18 and the door inner panel 6, the door inner panel 6 is less likely to be deformed. Thus, most of vibrational energy generated in the door latch unit 16 is efficiently transmitted to the door module 8 as vibrational energy causing vibrations in the door module 8 but not as energy causing deformation in the door inner panel 6. This makes it possible to reliably create the 1×1 mode vibration where a single vibration antinode is largely formed in the door module 8 in the longitudinal direction of the automobile body.

Further, the region of the door module 8 connected using the common fastener is formed with the reinforcement rib 86 extending in a direction from the door latch unit 16 to the door module 8. Thus, the vibrations generated in the door latch unit 16 can be effectively transmitted to the door module 8.

Functions/effects of the vibration-blocking reinforcement portion 90 in the door structure according to this embodiment, which is formed in the door inner panel 6 to allow the low-frequency vibration to be more reliably radiated from the door module 8, will be described below.

In this embodiment, the vibration-blocking reinforcement portion 90 (first vibration-blocking portion 92*a*) is formed in the regions 6*b*, 6*d*, 6*e* of the door inner panel 6 except for the rear region 6*c* having the door latch unit 16 fixed thereto, to surround the door module 8. Thus, vibrations transmitted to the door module 8 become less likely to be largely transmitted to the regions 6*b*, 6*d*, 6*e*. This makes it possible to prevent the occurrence of acoustic radiation of a high-frequency from the door inner panel 6. Specifically, while the door inner panel 6 is liable is likely to create a high-frequency sound due to steel used as its material, a relatively small area in each of the regions 6*b*, 6*d*, 6*e*, and a complicated contour of, particularly, the opening 6*a*, the vibration-blocking reinforcement portion 90 can reduce vibrations to be transmitted from the door module 8 to the door inner panel so as to prevent the occurrence of such a high-frequency sound.

Further, the second vibration-blocking portion 92*b* extends continuously from the first vibration-blocking portion 92*a* on the upper and lower sides of the door latch unit 16 to suppress the transmission of vibrations generated in the door latch mechanism 20 to the upper region 6*d* and lower region 6*e*. This makes it possible to prevent the occurrence of acoustic radiation of a high-frequency sound in the upper and lower regions 6*d*, 6*e* and the front region 6*b* continuing to these regions 6*d*, 6*e*.

The vibration-blocking reinforcement portion 90 is formed to extend continuously and linearly. Thus, the above functions/effects of the vibration-blocking reinforcement portion 90 can be more reliably obtained.

Further, no vibration-blocking reinforcement portion 90 surrounding the door module 8 is formed in the rear region 6*c*. This allows vibrations generated in the door latch mechanism 20 to be efficiently transmitted to the door module 8.

The vibration-blocking reinforcement portion 90 is composed of the step-shaped portion 92 having a high rigidity. Thus, vibrations which would otherwise be transmitted from the door module 8 to the door inner panel 6 or from the door latch mechanism 20 directly to the door inner panel 6, can be effectively blocked. In addition, the door inner panel 6 reinforced by the vibration-blocking reinforcement portion 90 becomes less likely to be vibrated to suppress the occurrence of a high-frequency sound.

This step-shaped portion 92 is formed to protrude outside from the surface of the door module 8. That is, the step-shaped portion 92 is formed as a wall opposed to the outer edge of the door module 8 in an in-surface direction. This allows a low-frequency sound radiated from the door module 8 to be maintained without escaping from a gap between the door module 8 and the door inner panel 6, so that acoustic radiation energy radiated from the door module 8 can be maintained without reduction. Particularly, in this embodiment, the plurality of connection portions 22 are alighted along the outer edge region and spaced apart from each other, and the connection portions 22a are designed to be displaceable. Thus, when the door module is vibrated, a gap between the door module 8 and the door inner panel 6 will be effectively created. The vibration-blocking reinforcement portion 90 may be formed as the bead-shaped portion 94 to obtain the same functions/effects.

While the automobile door structure of the present invention has been described based on the above specific embodiment where it is applied to a front door of an automobile, the present invention may also be applied to any other suitable door, such as a rear door or a slide door.

In summary, the present invention provides an automobile door structure supported on an automobile body and adapted to be engaged with and disengaged from the automobile body through a door latch, which comprises an outer segment, and an inner segment disposed on the side of an automobile cabin relative to the outer segment and provided with the door latch. The inner segment includes enhancement means for enhancing an acoustic conversion efficiency of a vibration having a specific low frequency among vibrations of the door latch generated during door closing.

According to the automobile door structure of the present invention, the inner segment having the door latch includes the enhancement means for enhancing an acoustic conversion efficiency of a vibration having a specific low frequency among vibrations of the door latch generated during door closing. Thus, vibrational energy of the specific low frequency capable of creating the impression of dignity on an occupant, among vibration of the door latch generated during door closing will be converted to enhanced acoustic radiation energy. This makes it possible to enhance a low-frequency sound to be radiated from the inner segment so as to allow the occupant to receive the impression of dignity from the door closing sound. Further, this enhanced low-frequency sound is radiated to a space between the outer segment and the inner segment, and then radiated outside the automobile through the outer segment. The door closing sound transmitted through the outer segment is reduced in high-frequency components, so that the impression of dignity can be more reliably created on a user who is outside the automobile.

In the automobile door structure of the present invention, when the inner segment includes a door inner panel formed with an opening, and a resin door module provided with a functional door component and attached to the door inner panel in such a manner as to cover over the opening of the door inner panel, the enhancement means may be formed in the door module.

According to this 1st specific structure, the enhancement means is formed in the door module made of resin excellent in formability. Thus, an automobile door structure capable of enhancing a low-frequency sound can be obtained without adverse affects on cost, weight and assembling performance.

The enhancement means may be specifically designed to have various structures. For example, when the door module is formed with a hole portion for mounting the functional door component or for assembling or service, the enhancement means may be designed in such a manner that a reinforcement portion is integrally formed with the door module to reinforce the hole portion so as to allow the hole portion and its surrounding region to have an approximately homogeneous rigidity distribution.

According to this 2nd specific structure, the hole portion and its surrounding region are formed to have an approximately homogeneous rigidity distribution. Thus, for example, a vibration node is less likely to occur in the hole portion, or a vibration having a bending at the boundary between the hole portion and its surrounding is less likely to occur. That is, the hole portion and its surrounding region becomes more likely to be integrally vibrated so as to allow vibrations of a low-order mode having high acoustic radiation efficiency to be more reliably created in the door module. In addition, the amplitude distribution of an antinode of a vibration with a specific low frequency among the low-order mode vibrations can be smoothened. These make it possible to enhance the acoustic radiation efficiency of the specific-low-frequency vibration, while preventing the occurrence of high-frequency vibrations.

The enhancement means may also be designed in such a manner that the functional door component is mounted on a region of the door module which otherwise has an inhomogeneous rigidity distribution, so as to allow the region to have an approximately homogeneous rigidity distribution.

According to this 3rd specific structure, the functional door component is mounted on a region of the door module which otherwise has an inhomogeneous rigidity distribution, so as to allow the region to have an approximately homogeneous rigidity distribution. Thus, for example, a vibration node is less likely to occur in a region having an inhomogeneous rigidity, or a vibration curved at a low-rigidity position in the region having an inhomogeneous rigidity is less likely to occur. That is, the region mounting the functional door component to have an approximately homogeneous rigidity distribution becomes more likely to be integrally vibrated so as to allow vibrations of a low-order mode having high acoustic radiation efficiency to be more reliably created in the door module. In addition, the amplitude distribution of an antinode of a vibration with a specific low frequency among the low-order mode vibrations can be smoothened. These make it possible to enhance the acoustic radiation efficiency of the specific-low-frequency vibration, while preventing the occurrence of high-frequency vibrations.

When the functional door component is mounted on a region of the door module which has an inhomogeneous rigidity distribution, at a plurality of positions, the enhancement means may be designed in such a manner that the plurality of positions are approximately aligned along a direction orthogonal to a direction oriented toward the center of the door module.

According to this 4th specific structure, the mounted positions of the functional door component are approximately aligned along a direction orthogonal to a direction oriented toward the center of the door module. Thus, the functional door component can be mounted to prevent the rigidity of the mounted region from being increased in the direction oriented toward the center of the door module, so as to allow vibrations of a low-order mode having high acoustic radiation efficiency to be more reliably created in the door module. In addition, the amplitude distribution of an antinode of a vibration with a specific low frequency among the low-order mode vibrations can be smoothened. These make it possible to enhance the acoustic radiation efficiency of the specific-low-frequency vibration, while preventing the occurrence of high-frequency vibrations.

Further, the enhancement means may be designed in such a manner that the functional door component is mounted on the door module to allow a weight of the functional door component to be imposed on approximately the center of the door module.

According to this 5th specific structure, the functional door component is mounted on the door module to allow a weight of the functional door component to be imposed on approximately the center of the door module. Thus, approximately the center of the door module is more likely to be vibrated with a large vibration amplitude due to the weight of the functional door component, so as to allow a 1×1 mode vibration to be created in approximately the entire door module. This 1×1 mode vibration makes it possible to more reliably enhance the acoustic radiation efficiency of the specific-low-frequency vibration.

In the 5th specific structure, the functional door component may be mounted on the door module through a bracket at approximately the center of the door module and in the vicinity of an attached region of the door module to the door inner panel.

According to this 6th specific structure, the functional door component is mounted on the door module through the bracket. Thus, the enhancement means can be readily incorporated in the door module. That is, the weight of the functional door component can be imposed on approximately the center of the door module to enhance the acoustic radiation efficiency as described above. In addition, the functional door component is mounted in the vicinity of the attached region of the door module to the door inner panel, where the vibration created in the door module has a small vibration amplitude. This makes it possible to avoid hindering the creation of the low-frequency vibration in the door module.

When the enhancement means is adapted to create a low-order vibration mode in the door module, the enhancement means may be designed in such a manner that the functional door component is mounted on the door module through a bracket at positions corresponding, respectively, to an antinode and a node of a vibration of the low-order vibration mode, so as to allow the low-order vibration mode to be created in the door module.

According to the 7th specific structure, the functional door component is mounted on the door module through the bracket at positions corresponding, respectively, to an antinode and a node of a vibration of the low-order vibration mode. Thus, the functional door component can be mounted on the door module to impose the weight of the functional door on the position corresponding to the vibration antinode so as to allow the vibration antinode to be created with a large vibration amplitude. The functional door component can also be mounted on the door module to impose the weight of the functional door on the position corresponding to the vibration node so as to avoid hindering the creation of the low-order mode vibration in the door module. This low-order vibration mode makes it possible to more reliably enhance the acoustic radiation efficiency of the specific-low-frequency vibration.

Further, the enhancement means may be designed in such a manner that an annular-shaped reinforcement portion is integrally formed with the door module to extend annularly and approximately about the center of the door module.

According to the 8th specific structure, the annular-shaped reinforcement portion extends annularly and approximately about the center of the door module. Thus, approximately the center of the door module is more likely to be vibrated with a large vibration amplitude so as to allow the 1×1 mode vibration to be created in approximately the entire door module. This 1×1 mode vibration makes it possible to more reliably enhance the acoustic radiation efficiency of the specific-low-frequency vibration.

In the 8th specific structure, a plural number of the annular-shaped reinforcement portions may be formed in a concentric pattern.

According to this 9th specific structure, the 1×1 mode vibration can be more reliably created in approximately the entire door module.

In the 8th specific structure, the enhancement means may be designed in such a manner that a linear-shaped reinforcement portion is integrally formed with the door module to extend from a first side region of the door module adjacent to the door latch to a second side region of the door module opposite to the first side region through approximately the center of the door module.

According to this 10th specific structure, the linear-shaped reinforcement portion extends from the first side region of the door module adjacent to the door latch to the second side region opposite to the first side region through approximately the center of the door module. Thus, the rigidity of the door module can be adjusted to be homogenized overall. This makes it possible to prevent a vibration node from being created in approximately the entire door module so as to allow the 1×1 mode vibration to be more reliably created in approximately the entire door module. In addition, a vibration antinode having a smooth amplitude distribution can be created in approximately the entire door module. These make it possible to more reliably enhance the acoustic radiation efficiency of the specific-low-frequency vibration.

In the 8th specific structure, the enhancement means may be designed to mount the functional door component at approximately the center of the door module.

According to this 11th specific structure, the functional door component is mounted at approximately the center of the door module. Thus, the weight of the functional door component can be imposed on approximately the center of the door module to allow approximately the center of the door module to be vibrated with a large vibration amplitude. In addition, the 1×1 mode vibration can be more reliably created. These make it possible to more reliably enhance the acoustic radiation efficiency of the specific-low-frequency vibration.

In the 8th specific structure of the enhancement means, the functional door component may be mounted on the annular-shaped reinforcement portion.

According to this 12th specific structure, the functional door component is mounted on the annular-shaped reinforcement portion having an increased rigidity. This makes it possible to avoid hindering the creation of the specific-low-frequency vibration in the door module.

In the 1st specific structure, when the door latch in the above automobile door structure is fixed to the door inner panel through a bracket, all of the door module, the door inner panel and the door latch bracket may be connected together using a common fastener.

According to this 13th specific structure, all of the door module, the door inner panel and the door latch bracket are connected together using a common fastener. Thus, a vibration generated by the door latch can be efficiently transmitted to the door module. This allows the enhancement means to more effectively enhance a low-frequency sound capable of giving the impression of dignity on an occupant.

In the 13th specific structure, the door latch bracket and the door inner panel may define a triangular-shaped closed section therebetween.

According to this 14th specific structure, a vibration generated by the door latch can be more efficiently transmitted to the door module. Specifically, the triangular-shaped closed section allows the door inner panel to become less likely to be deformed, so that vibrational energy generated in the door latch is mostly transmitted as vibrational energy causing vibrations in the door module but not as energy causing deformation in the door inner panel. This makes it possible for the enhancement means to more effectively enhance a low-frequency sound capable of giving the impression of dignity on an occupant.

Further, a region of the door module connected using the common fastener member may have a higher attaching rigidity to the door inner panel than the remaining region of the door module.

According to this 15th specific structure, a vibration generated by the door latch can be more efficiently transmitted to the door module. This makes it possible for the enhancement means to more effectively enhance a low-frequency sound capable of giving the impression of dignity on an occupant.

Further, the common fastener may be a plurality of bolts disposed on two lines extending along a direction intersecting with a direction oriented from the door latch toward the door module.

According to this 16th specific structure, the bolts are disposed on two lines extending along a direction intersecting with a direction oriented from the door latch toward the door module or a direction along which the vibration is transmitted. This makes it possible for the enhancement means to more effectively enhance a low-frequency sound capable of giving the impression of dignity on an occupant.

Further, a region of the door module connected using the common fastener may include a reinforcement portion integrally formed therewith to extend in a direction oriented from the door latch toward the door module.

According to this 17th specific structure, the reinforcement portion extends in a direction oriented from the door latch toward the door module or a direction along which the vibration is transmitted. Thus, the vibration can be more efficiently transmitted to the door module. This allows the enhancement means to more effectively enhance a low-frequency sound capable of giving the impression of dignity on an occupant.

In the 1st specific structure, the door inner panel in the may include a reinforcement portion which is formed to surround a region of the door module except for a side region of the door inner panel having the door latch fixed thereto, and adapted to block the vibration.

According to this 18th specific structure, the vibration-blocking reinforcement portion is formed to surround the region of the door module except for the side region of the door inner panel having the door latch fixed thereto. Thus, a vibration transmitted from the door latch to the door module becomes less likely to be transmitted to the region of the door module except for the side region of the door inner panel having the door latch fixed thereto. This allows the specific-low-frequency vibration to be efficiently converted to acoustic energy in the door module. The vibration transmitted from the door latch to the door module also becomes less likely to be transmitted to the door inner panel. For example, this can prevent the acoustic radiation of a high-frequency sound due to a shape of the door inner panel or the like. In addition, the inner panel reinforced by the vibration-blocking reinforcement portion becomes less likely to be vibrated, so that the creation of a high-frequency sound is suppressed. These make it possible to more reliably give the impression of dignity on an occupant.

In this 18th specific structure, the vibration-blocking reinforcement portion may be formed to continuously extend to the upper and lower ends of the side region of the door inner panel having the door latch fixed thereto.

According to this 19th specific structure, the vibration-blocking reinforcement portion is formed to continuously extend to the upper and lower ends of the side region of the door inner panel having the door latch fixed thereto. Thus, even if the door latch is fixed to the door inner panel, a vibration from the door latch becomes less likely to be transmitted to the region of the door module except for the side region of the door inner panel having the door latch fixed thereto. This allows the vibration from the door latch to be more largely transmitted to the door module and efficiently converted to acoustic energy in the door module. The vibration from the door latch also becomes less likely to be transmitted to the door inner panel. For example, this can prevent the acoustic radiation of a high-frequency sound due to a shape of the door inner panel or the like. In addition, the inner panel reinforced by the vibration-blocking reinforcement portion becomes less likely to be vibrated, so that the creation of a high-frequency sound is suppressed. These make it possible to more reliably give the impression of dignity on an occupant.

The above vibration-blocking reinforcement portion may be a step-shaped or bead-shaped portion protruding outward from a surface of the door module.

According to this 20th specific structure, the vibration-blocking reinforcement portion formed as a step-shaped or bead-shaped portion protruding outward from a surface of the door module allows a low-frequency sound radiated from the door module to be maintained without escaping from a gap between the door module and the door inner panel, so that acoustic radiation energy radiated from the door module can be maintained without reduction. This makes it possible to more reliably give the impression of dignity on an occupant.

In the 1st specific structure, when the door module is formed in a rectangular shape having two long edges and two short edges, and attached to the door inner panel along an outer edge region thereof through a plurality of connection portions, at least a part of two or more of the connection portions aligned along the long edges may be less rigidly connected to the door inner panel than two or more of the connection portions aligned along the short edges, in such a manner as to allow the door module to be displaced relative to the door inner panel.

According to this 21st specific structure, at least a part of two or more of the connection portions aligned along the long edges is less rigidly connected to the door inner panel than two or more of the connection portions aligned along the short edges, in such a manner as to allow the door module to be displaced relative to the door inner panel. This makes it possible to avoid hindering the creation of the low-frequency vibration having a vibration antinode distributed in a direction of the long edges of the door module. A distance in the direction of the long edges is greater than that in a direction of the short edges, and thereby a vibration having a large wavelength and a large vibration amplitude is more likely to be distributed along the direction of the long edges. Thus, the structure allowing a displacement of the door module relative to the door inner panel can more reliably enhance a low-frequency sound capable of giving the impression of dignity on an occupant.

In the 1st specific structure, when the door module is attached to the door inner panel along an outer edge region thereof through a plurality of connection portions, at least a part of two or more of the connection portions aligned along a direction oriented from a first side region of the door module adjacent to the door latch toward a second side region of the door module opposite to the first side region is less rigidly connected to the door inner panel than two or more of the connection portions aligned along the first and second side regions, in such a manner as to allow a displacement of the door module relative to the door inner panel.

According to this 22nd specific structure, at least a part of two or more of the connection portions aligned along a direction oriented from the first side region of the door module adjacent to the door latch toward the second side region opposite to the first side region is less rigidly connected to the door inner panel than two or more of the connection portions aligned along the first and second side regions, in such a manner as to allow a displacement of the door module relative to the door inner panel. This makes it possible to avoid hindering the creation of the low-frequency vibration having a vibration antinode distributed in a direction of the first side region to the second side region opposite to the first region. A vibration generated in the door latch is transmitted from the first side region adjacent to the door latch toward the second side region of the door module, and thereby a vibration having a large wavelength and a large vibration amplitude is more likely to be distributed along this direction. Thus, the structure allowing a displacement of the door module relative to the door inner panel can more reliably enhance a low-frequency sound capable of giving the impression of dignity on an occupant.

In the 21st specific structure, each of the connection portions weakly (less rigidly) connected to allow the displacement may include an elastic member. In this case, the door module may be attached to the door inner panel through the elastic member.

According to this 23rd specific structure, the door module is attached to the door inner panel through the elastic member. This makes it possible to effectively allow the displacement of the door module relative to the door inner panel.

In the automobile door structure of the present invention, the specific low frequency may be about 200 Hz or less.

This 24th specific structure makes it possible to more effectively give the impression of dignity on an occupant.

In the automobile door structure of the present invention, the enhancement means may be adapted to create a 1×1 vibration mode in the inner segment in accordance with the vibrations of the door latch generated during door closing.

This 25th specific structure makes it possible to more reliably enhance the acoustic radiation efficiency of the specific-low-frequency vibration based on the 1×1 vibration mode.

In the 1st specific structure, the enhancement means may be designed in such a manner that a reinforcement portion is integrally formed with the door module to adjust a rigidity of the door module so as to allow a 1×1 vibration mode to be created in the door module.

According to this 26th specific structure, the door module made of resin excellent in formability is integrally formed with the reinforcement portion to adjust the rigidity of the door module in such a manner as to create the 1×1 vibration mode in the door module. Thus, the acoustic radiation efficiency of the specific-low-frequency vibration can be more reliably enhanced at lower cost.

The present invention also provides an automobile door structure supported on an automobile body in an openable and closable manner through a door latch (supported on an automobile body and adapted to be engaged with and disengaged from the automobile body through a door latch), which comprises an outer segment, and an inner segment disposed on the side of an automobile cabin relative to the outer segment and provided with the door latch, the inner segment including an enhancement structure for enhancing an acoustic conversion efficiency of a vibration having a specific low frequency among vibrations of the door latch generated during door closing.

As mentioned above, the automobile door structure of the present invention can enhance a low-frequency sound capable of giving the impression of dignity on an occupant.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be considered as being included therein.

This application is based on five Japanese Patent Applications, namely JP2004-280370; JP2004-280371; JP2004-280372; JP2004-280373; and JP2004-280374, all of which filed on Sep. 27, 2004, the contents of which are hereby incorporated by reference.

What is claimed is:

1. An automobile door structure supported on an automobile body and adapted to be engaged with and disengaged from said automobile body through a door latch, comprising:
   an outer segment; and
   an inner segment disposed on the side of an automobile cabin relative to said outer segment and provided with said door latch, said inner segment including enhancement means for enhancing an acoustic conversion efficiency of a vibration having a specific low frequency among vibrations of said door latch generated during door closing,
   wherein said inner segment includes
      a door inner panel formed with an opening; and
      a door module made of resin, said door module being provided with a functional door component and attached to said door inner panel in such a manner as to cover over the opening of said door inner panel,
   wherein said enhancement means is formed in said door module, and
   wherein said door module is formed in a rectangular shape having two long edges and two short edges, and attached to said door inner panel along an outer edge region thereof through a plurality of connection portions, at least a part of two or more of said connection portions aligned along said long edges being less rigidly connected to said door inner panel than two or more of said connection portions aligned along said short edges, in such a manner as to allow said door module to be displaced relative to said door inner panel.

2. The automobile door structure as defined in claim 1, wherein said door module is formed with a hole portion for mounting said functional door component or for assembling or service, wherein said enhancement means is designed in such a manner that a reinforcement portion is integrally formed with said door module to reinforce said hole portion so as to allow said hole portion and its surrounding region to have an approximately homogeneous rigidity distribution.

3. The automobile door structure as defined in claim 1, wherein said enhancement means is designed in such a manner that said functional door component is mounted on a region of said door module which otherwise has an inhomogeneous rigidity distribution, so as to allow said region to have an approximately homogeneous rigidity distribution.

4. The automobile door structure as defined in claim 1, wherein said functional door component is mounted on a region of said door module which has an inhomogeneous rigidity distribution, at a plurality of positions, wherein said enhancement means is designed in such a manner that said plurality of positions are approximately aligned along a direction orthogonal to a direction oriented toward the center of said door module.

5. The automobile door structure as defined in claim 1, wherein said enhancement means is designed in such a manner that said functional door component is mounted on said door module to allow a weight of said functional door component to be imposed on approximately the center of said door module.

6. The automobile door structure as defined in claim 5, wherein said functional door component is mounted on said door module through a bracket at approximately the center of said door module and in the vicinity of an attached region of said door module to said door inner panel.

7. The automobile door structure as defined in claim 1, wherein said enhancement means is adapted to create a low-order vibration mode in said door module, said enhancement means being designed in such a manner that said functional door component is mounted on said door module through a bracket at positions corresponding, respectively, to an antinode and a node of a vibration of said low-order vibration mode, so as to allow said low-order vibration mode to be created in said door module.

8. The automobile door structure as defined in claim 1, wherein said door latch is fixed to sold door inner panel through a bracket, and all of said door module, said door inner panel and said door latch bracket are connected together using a common fastener.

9. The automobile door structure as defined in claim 8, wherein said door latch bracket and said door inner panel define a triangular-shaped closed section therebetween.

10. The automobile door structure as defined in claim 8, wherein a region of said door module connected using said common fastener has a higher attaching rigidity to said door inner panel Than the remaining region of said door module.

11. The automobile door structure as defined in claim 8, wherein said common fastener comprises a plurality of bolts disposed on two lines extending along a direction intersecting with a direction oriented from said door latch toward said door module.

12. The automobile door structure as defined in claim 8, wherein a region of said door module connected using said common fastener includes a reinforcement portion integrally formed therewith to extend in a direction oriented from said door latch toward said door module.

13. The automobile door structure as defined in claim 1, wherein said door inner panel includes a reinforcement portion which is formed to surround a region of said door module except for a side region of said door inner panel having said door latch fixed thereto, and adapted to block the vibration.

14. The automobile door structure as defined in claim 13, wherein said vibration-blocking reinforcement portion is formed to continuously extend to the upper and lower ends of the side region of said door inner panel having said door latch fixed thereto.

15. The automobile door structure as defined in claim 13, wherein said vibration-blocking reinforcement portion is a step-shaped or bead-shaped portion protruding outward from a surface of said door module.

16. The automobile door structure as defined in claim 1, wherein each of said connection portions less rigidly connected to allow said displacement includes an elastic member, and wherein said door module is attached to said door inner panel through said elastic member.

17. The automobile door structure as defined in claim 1, wherein said specific low frequency is about 200 Hz or less.

18. The automobile door structure as defined in claim 1, wherein said enhancement means is adapted to create a 1×1 vibration mode in said inner segment in accordance with the vibrations of said door latch generated during door closing.

19. The automobile door structure as defined in claim 1, wherein said enhancement means is designed in such a manner that a reinforcement portion is integrally formed with said door module to adjust a rigidity of said door module, so as to allow a 1×1 vibration mode to be created in said door module.

20. An automobile door structure supported on an automobile body and adapted to be engaged with and disengaged from said automobile body through a door latch, comprising:
an outer segment; and
an inner segment disposed on the side of an automobile cabin relative to said outer segment and provided with said door latch, said inner segment including enhancement means for enhancing an acoustic conversion efficiency of a vibration having a specific low frequency among vibrations of said door latch generated during door closing,
wherein said inner segment includes
a door inner panel formed with an opening; and
a door module made of resin, said door module being provided with a functional door component and attached to said door inner panel in such a manner as to cover over the opening of said door inner panel,
wherein said enhancement means is formed in said door module, and
wherein said door module is attached to said door inner panel along an outer edge region thereof through a plurality of connection portions, at least a part of two or more of said connection portions aligned along a direction oriented from a first side region of said door module adjacent to said door latch toward a second side region of said door module opposite to said first side region being less rigidly connected to said door inner panel than two or more of said connection portions aligned along said first and second side regions, in such a manner as to allow a displacement of said door module relative to said door inner panel.

* * * * *

UNITED STATES PATENT AND TRADEMARK OFFICE
CERTIFICATE OF CORRECTION

PATENT NO.         : 7,468,654 B2
APPLICATION NO.    : 11/212781
DATED              : December 23, 2008
INVENTOR(S)        : Naohisa Uesugi et al.

Page 1 of 1

It is certified that error appears in the above-identified patent and that said Letters Patent is hereby corrected as shown below:

Column 27, Line 22, Claim 8 change "sold" to --said--.

Column 27, Line 32, Claim 10 change "Than" to --than--.

Signed and Sealed this

Seventeenth Day of March, 2009

JOHN DOLL
*Acting Director of the United States Patent and Trademark Office*